United States Patent
Zhao et al.

(10) Patent No.: US 11,736,706 B2
(45) Date of Patent: Aug. 22, 2023

(54) VIDEO DECODING METHOD AND APPARATUS, AND DECODING DEVICE

(71) Applicant: Huawei Technologies Co., Ltd., Shenzhen (CN)

(72) Inventors: Yin Zhao, Hangzhou (CN); Haitao Yang, Shenzhen (CN); Lian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 17/357,473

(22) Filed: Jun. 24, 2021

(65) Prior Publication Data
US 2021/0321127 A1   Oct. 14, 2021

Related U.S. Application Data

(63) Continuation of application No. PCT/CN2019/127872, filed on Dec. 24, 2019.

(30) Foreign Application Priority Data

Dec. 24, 2018 (CN) .......................... 201811584655.2
Mar. 22, 2019 (CN) .......................... 201910222973.2

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/176* (2014.11); *H04N 19/96* (2014.11)

(58) Field of Classification Search
None
See application file for complete search history.

(56) References Cited

U.S. PATENT DOCUMENTS 11,516,504 B2* 11/2022 Xu ....................... H04N 19/423
2013/0114692 A1   5/2013 Sze et al.
(Continued)

FOREIGN PATENT DOCUMENTS

CN   102970526 A    3/2013
CN   104170383 A   11/2014
(Continued)

OTHER PUBLICATIONS

"Line Transmission of Non-Telephone Signals, Video Codec for Audiovisual Services At p×64 kbits," ITU-T H.261 (Mar. 1993), total 29 pages, International Telecommunication Union (Mar. 1993).
(Continued)

*Primary Examiner* — Kaitlin A Retallick
(74) *Attorney, Agent, or Firm* — Leydig, Voit & Mayer, Ltd.

(57) ABSTRACT

A video decoding method includes: obtaining block information of a current picture block; determining, based on the block information, whether a split mode of a set of optional split modes is available; determining a split mode of the current picture block from a determined available split mode; obtaining at least one coding unit (CU) from the current picture block based on the split mode of the current picture block, and parsing a bitstream including the current picture block, to obtain decoding information of the at least one CU, and decoding the at least one CU based on the decoding information, to obtain a reconstructed block.

34 Claims, 10 Drawing Sheets

(51) Int. Cl.
  *H04N 19/176* (2014.01)
  *H04N 19/96* (2014.01)

(56) References Cited

U.S. PATENT DOCUMENTS

| | | | | |
|---|---|---|---|---|
| 2020/0077094 | A1* | 3/2020 | Poirier | H04N 19/167 |
| 2021/0037266 | A1* | 2/2021 | Nam | H04N 19/119 |
| 2021/0044829 | A1* | 2/2021 | Xu | H04N 19/57 |
| 2021/0185362 | A1* | 6/2021 | Zhang | H04N 19/176 |
| 2021/0250649 | A1* | 8/2021 | Zhang | H04N 19/13 |
| 2021/0368172 | A1* | 11/2021 | Lim | H04N 19/1883 |
| 2021/0377525 | A1* | 12/2021 | Lim | H04N 19/119 |
| 2021/0377531 | A1* | 12/2021 | Zhang | H04N 19/96 |

FOREIGN PATENT DOCUMENTS

| | | |
|---|---|---|
| CN | 104754362 A | 7/2015 |
| CN | 104811731 A | 7/2015 |
| CN | 107566848 A | 1/2018 |
| CN | 107979756 A | 5/2018 |
| CN | 108702507 A | 10/2018 |
| JP | 2006217480 A | 8/2006 |
| TW | 201826800 A | 7/2018 |

OTHER PUBLICATIONS

"Series H: Audiovisual and Multimedia Systems, Infrastructure of audiovisual services—Coding of moving video Information technology—Generic coding of moving pictures and associated audio information: Video: Frame packing arrangement signalling for 3D content," ITU-T H.262 (Feb. 2012), total 238 pages, International Telecommunication Union (Feb. 2012).

"Series H: Audiovisual and Multimedia Systems, Infrastructure of audiovisual services—Coding of moving video, Video coding for low bit rate communication," ITU-T H.263(Jan. 2005), total 226 pages, International Telecommunication Union (Jan. 2005).

"Series H: Audiovisual and Multimedia Systems, Infrastructure of audiovisual services—Coding of moving video, Advanced video coding for generic audiovisual services," ITU-T H.264(Apr. 2017), total 812 pages, International Telecommunication Union (Apr. 2017).

"Series H: Audiovisual and Multimedia Systems Infrastructure of audiovisual services—Coding of moving video, High efficiency video coding," ITU-T H.265(Feb. 2018), total 692 pages, International Telecommunication Union (Feb. 2018).

* cited by examiner

VIDEO DECODING METHOD AND APPARATUS, AND DECODING DEVICE

CROSS-REFERENCE TO RELATED APPLICATIONS

This application is a continuation of International Application No. PCT/CN2019/127872, filed on Dec. 24, 2019, which claims priority to Chinese Patent Application No. 201811584655.2, filed on Dec. 24, 2018 and priority to Chinese Patent Application No. 201910222973.2, filed on Mar. 22, 2019. All of the aforementioned patent applications are hereby incorporated by reference in their entireties.

FIELD

This application relates to the video coding field, and in particular, to a video decoding method and apparatus, and a decoding device.

BACKGROUND

Video coding (video encoding and decoding) is used in a wide range of digital video applications, for example, broadcast digital television, video transmission over the internet and mobile networks, real-time conversational applications such as video chat and video conferencing, digital versatile discs (DVDs) and Blu-ray discs, video content collection and editing systems, and security applications of camcorders.

With development of a block-based hybrid video coding approach in the H.261 standard in 1990, new video coding technologies and tools are developed and form a basis for new video coding standards. Other video coding standards include MPEG-1 video, MPEG-2 video, ITU-T H.262/MPEG-2, ITU-T H.263, ITU-T H.264/MPEG-4 Part 10: advanced video coding (AVC), ITU-T H.265/high efficiency video coding (HEVC), and extensions, for example, scalability and/or three-dimensional (3D) extensions, of these standards. As videos are created and used more widely, video traffic is a biggest burden on communication networks and data storage. Therefore, one of goals of most of the video coding standards is to reduce a bit rate without sacrificing picture quality in comparison with a previous standard. Even though the latest HEVC enables a video to be compressed about twice as much as the AVC without sacrificing picture quality, a new technology is urgently needed to further compress the video in comparison with the HEVC.

When a frame of picture is to be coded, the picture is first split into picture blocks of a same size, where the picture blocks are referred to as largest coding units (LCU); and then a recursive split operation is performed on one LCU, so that one or more coding units (CU) may be obtained. There are two types of LCUs: 128×128 and 64×64. On the basis of quadtree (QT) split, the following split modes are added in an existing coding standard: a binary tree (BT) split mode (including horizontal binary split (HBT) and vertical binary split (VBT)) and an extended quadtree (EQT) split mode (including horizontal extended quad split (HEQT) and vertical extended quad split (VEQT)).

However, if a split mode of a picture block is to be determined in a video coding process, rate-distortion costs (RD cost) corresponding to a plurality of split modes need to be calculated first, and an optimal split mode of the picture block can be determined only after the rate-distortion costs are compared. Consequently, calculation of video coding is excessively complex.

SUMMARY

Embodiments of this application provide a video decoding method and apparatus, and a decoding device. When a split mode of a current picture block is to be obtained, whether the split mode is available is determined, so as to avoid transmitting information about the split mode in a bitstream as much as possible. This improves coding efficiency, and reduces calculation complexity of video decoding.

According to a first aspect, an embodiment of this application provides a video decoding method, including: obtaining block information of a current picture block; determining, based on the block information, whether a split mode in a set of optional split modes is available, where the set of optional split modes includes a non-split mode; determining a split mode of the current picture block from a determined available split mode; obtaining one CU or a plurality of CUs from the current picture block based on the split mode of the current picture block, where the one CU is obtained by applying the non-split mode to the current picture block; and parsing a bitstream including the current picture block, to obtain decoding information of the one CU or the plurality of CUs, and decoding the CU based on the decoding information, to obtain a reconstructed block.

According to this application, when the split mode of the current picture block is to be obtained, whether the split mode is available is determined, so as to avoid transmitting information about the split mode in the bitstream as much as possible. This improves coding efficiency, and reduces calculation complexity of video decoding.

In a possible implementation, the set of optional split modes further includes a horizontal binary tree HBT split mode, a vertical binary tree VBT split mode, a horizontal extended quadtree HEQT split mode, a vertical extended quadtree VEQT split mode, and a quadtree QT split mode.

In a possible implementation, determining, based on the block information, whether the non-split mode is available includes: determining, based on the block information, whether the current picture block meets a condition in a first determining condition set, where if the current picture block meets at least one condition in the first determining condition set, the non-split mode is unavailable; or if the current picture block meets none of conditions in the first determining condition set, the non-split mode is available.

The first determining condition set includes one or more of the following conditions:

(1) the current picture block is an I slice or an I frame, and a side length of the current picture block is equal to MaxLCU, where MaxLCU is a side length of a largest coding unit LCU;

(2) a ratio of a long side to a short side of the current picture block is greater than maxAspectRatio, where maxAspectRatio is an integer greater than or equal to 1;

(3) the current picture block exceeds a boundary of a picture in which the current picture block is located;

(4) a width of the current picture block is greater than pipelineSize, and a height of the current picture block is less than pipelineSize, where pipelineSize is an integer greater than or equal to 16; and (5) a height of the current picture block is greater than pipelineSize, and a width of the current picture block is less than pipelineSize.

In a possible implementation, determining, based on the block information, whether the HBT split mode is available includes: determining, based on the block information, whether the current picture block meets a condition in a second determining condition set, where if the current picture block meets at least one condition in the second determining condition set, the HBT split mode is unavailable; or if the current picture block meets none of conditions in the second determining condition set, the HBT split mode is available.

The second determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) the current picture block exceeds a bottom boundary of a picture in which the current picture block is located, a width of the current picture block is greater than K, and a height of the current picture block is equal to K, where K includes 128, 64, 32, 16, 8, or 4;

(4) a width of the current picture block is greater than pipelineSize, and a height of the current picture block is less than or equal to pipelineSize, where pipelineSize is an integer greater than or equal to 1;

(5) the current picture block exceeds a right boundary or a bottom-right boundary of a picture in which the current picture block is located;

(6) at least one side length of the current picture block is greater than maxBTSize, where maxBTSize is an integer greater than or equal to 8;

(7) a height of the current picture block is equal to a minimum CU side length;

(8) the current picture block does not exceed a boundary of a picture in which the current picture block is located, and a ratio of a width to a height of the current picture block is greater than or equal to maxRatio, where maxRatio is an integer greater than or equal to 1;

(9) a ratio of a width to a height of the current picture block is greater than or equal to maxRatio, where maxRatio is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a possible implementation, determining, based on the block information, whether the VBT split mode is available includes: determining, based on the block information, whether the current picture block meets a condition in a third determining condition set, where if the current picture block meets at least one condition in the third determining condition set, the VBT split mode is unavailable; or if the current picture block meets none of conditions in the third determining condition set, the VBT split mode is available.

The third determining condition set includes one or more of the following conditions:

(1) the current picture block is an I slice or an I frame, and a side length of the current picture block is equal to MaxLCU, where MaxLCU is a side length of an LCU;

(2) a size of the current picture block is M×128, where M is a natural number less than 128;

(3) the current picture block exceeds a bottom boundary or a bottom-right boundary of a picture in which the current picture block is located;

(4) the current picture block exceeds a right boundary of a picture in which the current picture block is located, a width of the current picture block is equal to K, and a height of the current picture block is greater than K, where K includes 128, 64, 32, 16, 8, or 4;

(5) a ratio of a width to a height of the current picture block is equal to minRatio, where minRatio is greater than 0 and less than or equal to 1;

(6) at least one side length of the current picture block is greater than maxBTSize, where maxBTSize is an integer greater than or equal to 16;

(7) a width of the current picture block is equal to a minimum CU side length;

(8) the current picture block does not exceed a boundary of a picture in which the current picture block is located, and a ratio of a height to a width of the current picture block is greater than or equal to maxRatio, where maxRatio is an integer greater than or equal to 1;

(9) a height of the current picture block is greater than pipelineSize, and a width of the current picture block is less than or equal to pipelineSize, where pipelineSize is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a possible implementation, determining, based on the block information, whether the HEQT split mode is available includes: determining, based on the block information, whether the current picture block meets a condition in a fourth determining condition set, where if the current picture block meets at least one condition in the fourth determining condition set, the HEQT split mode is unavailable; or if the current picture block meets none of conditions in the fourth determining condition set, the HEQT split mode is available.

The fourth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to maxRatio, where maxRatio is an integer greater than or equal to 1;

(6) at least one side length of the current picture block is greater than maxEQTSize, where maxEQTSize is an integer greater than or equal to 16;

(7) a height of the current picture block is less than or equal to minCUSize×2, or a width of the current picture block is equal to minCUSize, where minCUSize is a minimum CU side length;

(8) a ratio of a width to a height of the current picture block is greater than or equal to maxRatioEQT, where maxRatioEQT is an integer greater than or equal to 1;

(9) the current picture block exceeds a boundary of a picture in which the current picture block is located; and

(10) a quantity of layers obtained by performing binary tree split and/or extended quadtree split on the current picture block is greater than or equal to maxBTTDepth, where maxBTTDepth is an integer greater than or equal to 1.

In a possible implementation, determining, based on the block information, whether the VEQT split mode is available includes: determining, based on the block information, whether the current picture block meets a condition in a fifth determining condition set, where if the current picture block meets at least one condition in the fifth determining condition set, the VEQT split mode is unavailable; or if the current picture block meets none of conditions in the fifth determining condition set, the VEQT split mode is available.

The fifth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to minRatio, where minRatio is greater than 0 and less than or equal to 1;

(6) at least one side length of the current picture block is greater than maxEQTSize, where maxEQTSize is an integer greater than or equal to 16;

(7) a width of the current picture block is less than or equal to minCUSize×2, or a height of the current picture block is equal to minCUSize, where minCUSize is a minimum CU side length;

(8) the current picture block exceeds a boundary of a picture in which the current picture block is located; and (9) a quantity of layers obtained by performing binary tree split and/or extended quadtree split on the current picture block is greater than or equal to maxBTTDepth, where maxBTTDepth is an integer greater than or equal to 1.

In a possible implementation, determining, based on the block information, whether the QT split mode is available includes: determining, based on the block information, whether the current picture block meets a condition in a sixth determining condition set, where if the current picture block meets at least one condition in the sixth determining condition set, the QT split mode is unavailable; or if the current picture block meets none of conditions in the sixth determining condition set, the QT split mode is available.

The sixth determining condition set includes one or more of the following conditions:

(1) a size of the current picture block is 128×N, where N is a natural number less than 128;

(2) a size of the current picture block is M×128, where M is a natural number less than 128;

(3) a ratio of a width to a height of the current picture block is equal to maxRatio, where maxRatio is an integer greater than or equal to 1;

(4) a ratio of a width to a height of the current picture block is equal to minRatio, where minRatio is greater than 0 and less than or equal to;

(5) at least one side length of the current picture block is less than minQtSize, where minQtSize is an integer greater than or equal to 4;

(6) a quantity of layers obtained by performing binary tree split and/or extended quadtree split on the current picture block is greater than 0; and (7) the current picture block exceeds a bottom boundary or a right boundary of a picture in which the current picture block is located.

In a possible implementation, the determining a split mode of the current picture block from a determined available split mode includes: determining the split mode of the current picture block based on a determining result about whether the split mode in the set of optional split modes is available; or parsing the bitstream to determine the split mode of the current picture block.

In a possible implementation, the determining the split mode of the current picture block based on a determining result about whether the split mode in the set of optional split modes is available includes: if the QT split mode is available, and all split modes in the set of optional split modes except the QT split mode are unavailable, determining that the split mode of the current picture block is the QT split mode; or if the QT split mode is available, and at least one split mode in the set of optional split modes other than the QT split mode is available, parsing the bitstream to determine the split mode of the current picture block.

In a possible implementation, if the QT split mode is unavailable, the determining the split mode of the current picture block based on a determining result about whether the split mode in the set of optional split modes is available further includes: if the non-split mode is available, and all split modes in the set of optional split modes except the non-split mode and the QT split mode are unavailable, determining that the split mode of the current picture block is the non-split mode; or if the non-split mode is available, and at least one split mode in the set of optional split modes other than the non-split mode and the QT split mode is available, parsing the bitstream to determine the split mode of the current picture block.

In a possible implementation, the obtaining one CU or a plurality of CUs from the current picture block based on the split mode of the current picture block includes: when the split mode of the current picture block is the non-split mode, determining that the current picture block is the one CU; or when the split mode of the current picture block is any split mode in the set of optional split modes except the non-split mode, splitting the current picture block based on the split mode of the current picture block, where if at least one side length of a sub-block obtained through split is T, and T is 4 or 8, the sub-block is the one CU; otherwise, the sub-block is further split.

According to a second aspect, an embodiment of this application provides a video decoding method, including: obtaining block information of a current picture block; determining a default split mode of the current picture block based on the block information; splitting the current picture block by using the default split mode, to obtain a plurality of coding units CUs; and parsing a bitstream including the current picture block, to obtain decoding information of the plurality of CUs, and decoding the CUs based on the decoding information, to obtain reconstructed blocks.

According to this application, when a split mode of the current picture block is to be obtained, the current picture block is split in a default mode, so as to avoid transmitting information about the split mode in the bitstream as much as possible. This improves coding efficiency, and reduces calculation complexity of video decoding.

In a possible implementation, the determining a default split mode of the current picture block based on the block information includes: determining, based on the block information, whether the current picture block meets a condition in a seventh determining condition set, where if the current picture block meets at least one condition in the seventh determining condition set, the default split mode is a quadtree QT split mode.

The seventh determining condition set includes one or more of the following conditions:

(1) the current picture block exceeds a bottom-right boundary of a picture in which the current picture block is located; and (2) the current picture block is an I slice or an I frame, and a width and a height of the current picture block each are equal to maxLCU, where maxLCU includes 64, 128, or 256.

In a possible implementation, the determining a default split mode of the current picture block based on the block information includes: determining, based on the block information, whether the current picture block meets a condition in an eighth determining condition set, where if the current picture block meets at least one condition in the eighth determining condition set, the default split mode is a vertical binary tree VBT split mode.

The eighth determining condition set includes one or more of the following conditions:

(1) if the current picture block exceeds a right boundary of a picture in which the current picture block is located, and a width and a height of the current picture block do not meet the following: the width is equal to K, the height is equal to L, K is less than L, and K and L each are an integer greater than or equal to 32, the VBT split mode is forcibly used for the current picture block; and (2) if the current picture block exceeds a bottom boundary of a picture in which the current picture block is located, and a width and a height of the current picture block meet the following: the width is equal to K, the height is equal to L, K is greater than L, K and L each are an integer greater than or equal to 32, the VBT split mode is forcibly used for the current picture block.

In a possible implementation, the determining a default split mode of the current picture block based on the block information includes: determining, based on the block information, whether the current picture block meets a condition in a ninth determining condition set, where if the current picture block meets at least one condition in the ninth determining condition set, the default split mode is a horizontal binary tree HBT split mode.

The ninth determining condition set includes one or more of the following conditions:

(1) if the current picture block exceeds a bottom boundary of a picture in which the current picture block is located, and a width and a height of the current picture block do not meet the following: the width is equal to K, the height is equal to L, K is greater than L, and K and L each are an integer greater than or equal to 32, the HBT split mode is forcibly used for the current picture block; and (2) if the current picture block exceeds a right boundary of a picture in which the current picture block is located, and a width and a height of the current picture block meet the following: the width is equal to K, the height is equal to L, K is less than L, K and L each are an integer greater than or equal to 32, the HBT split mode is forcibly used for the current picture block.

In a possible implementation, after the obtaining block information of a current picture block, the method further includes: determining, based on the block information, whether a split mode in a set of optional split modes is available, where the set of optional split modes includes the VBT split mode, the HBT split mode, a horizontal extended quadtree HEQT split mode, a vertical extended quadtree VEQT split mode, and the QT split mode; determining a split mode of the current picture block from a determined available split mode; splitting the current picture block by using the split mode of the current picture block, to obtain the plurality of CUs; and parsing the bitstream to obtain the decoding information of the plurality of CUs, and decoding the CUs based on the decoding information, to obtain the reconstructed blocks.

According to a third aspect, an embodiment of this application provides a video decoding apparatus, including:

an obtaining module, configured to obtain block information of a current picture block; a judging module, configured to determine, based on the block information, whether a split mode in a set of optional split modes is available, where the set of optional split modes includes a non-split mode; a determining module, configured to determine a split mode of the current picture block from a determined available split mode; a split module, configured to obtain one CU or a plurality of CUs from the current picture block based on the split mode of the current picture block, where the one CU is obtained by applying the non-split mode to the current picture block; and a decoding module, configured to parse a bitstream including the current picture block, to obtain decoding information of the one CU or the plurality of CUs, and decode the CU based on the decoding information, to obtain a reconstructed block.

In a possible implementation, the set of optional split modes further includes a horizontal binary tree HBT split mode, a vertical binary tree VBT split mode, a horizontal extended quadtree HEQT split mode, a vertical extended quadtree VEQT split mode, and a quadtree QT split mode.

In a possible implementation, the judging module is specifically configured to determine, based on the block information, whether the current picture block meets a condition in a first determining condition set, where if the current picture block meets at least one condition in the first determining condition set, the non-split mode is unavailable; or if the current picture block meets none of conditions in the first determining condition set, the non-split mode is available.

The first determining condition set includes one or more of the following conditions:

(1) the current picture block is an I slice or an I frame, and a side length of the current picture block is equal to MaxLCU, where MaxLCU is a side length of a largest coding unit LCU;

(2) a ratio of a long side to a short side of the current picture block is greater than maxAspectRatio, where maxAspectRatio is an integer greater than or equal to 1;

(3) the current picture block exceeds a boundary of a picture in which the current picture block is located;

(4) a width of the current picture block is greater than pipelineSize, and a height of the current picture block is less than pipelineSize, where pipelineSize is an integer greater than or equal to 16; and (5) a height of the current picture block is greater than pipelineSize, and a width of the current picture block is less than pipelineSize.

In a possible implementation, the judging module is specifically configured to determine, based on the block information, whether the current picture block meets a condition in a second determining condition set, where if the current picture block meets at least one condition in the second determining condition set, the HBT split mode is unavailable; or if the current picture block meets none of conditions in the second determining condition set, the HBT split mode is available.

The second determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) the current picture block exceeds a bottom boundary of a picture in which the current picture block is located, a width of the current picture block is greater than K, and a height of the current picture block is equal to K, where K includes 128, 64, 32, 16, 8, or 4;

(4) a width of the current picture block is greater than pipelineSize, and a height of the current picture block is less than or equal to pipelineSize, where pipelineSize is an integer greater than or equal to 1;

(5) the current picture block exceeds a right boundary or a bottom-right boundary of a picture in which the current picture block is located;

(6) at least one side length of the current picture block is greater than maxBTSize, where maxBTSize is an integer greater than or equal to 8;

(7) a height of the current picture block is equal to a minimum CU side length;

(8) the current picture block does not exceed a boundary of a picture in which the current picture block is located, and a ratio of a width to a height of the current picture block is greater than or equal to maxRatio, where maxRatio is an integer greater than or equal to 1;

(9) a ratio of a width to a height of the current picture block is greater than or equal to maxRatio, where maxRatio is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a possible implementation, the judging module is specifically configured to determine, based on the block information, whether the current picture block meets a condition in a third determining condition set, where if the current picture block meets at least one condition in the third determining condition set, the VBT split mode is unavailable; or if the current picture block meets none of conditions in the third determining condition set, the VBT split mode is available.

The third determining condition set includes one or more of the following conditions:

(1) the current picture block is an I slice or an I frame, and a side length of the current picture block is equal to MaxLCU, where MaxLCU is a side length of an LCU;

(2) a size of the current picture block is M×128, where M is a natural number less than 128;

(3) the current picture block exceeds a bottom boundary or a bottom-right boundary of a picture in which the current picture block is located;

(4) the current picture block exceeds a right boundary of a picture in which the current picture block is located, a width of the current picture block is equal to K, and a height of the current picture block is greater than K, where K includes 128, 64, 32, 16, 8, or 4;

(5) a ratio of a width to a height of the current picture block is equal to minRatio, where minRatio is greater than 0 and less than or equal to 1;

(6) at least one side length of the current picture block is greater than maxBTSize, where maxBTSize is an integer greater than or equal to 16;

(7) a width of the current picture block is equal to a minimum CU side length;

(8) the current picture block does not exceed a boundary of a picture in which the current picture block is located, and a ratio of a height to a width of the current picture block is greater than or equal to maxRatio, where maxRatio is an integer greater than or equal to 1;

(9) a height of the current picture block is greater than pipelineSize, and a width of the current picture block is less than or equal to pipelineSize, where pipelineSize is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a possible implementation, the judging module is specifically configured to determine, based on the block information, whether the current picture block meets a condition in a fourth determining condition set, where if the current picture block meets at least one condition in the fourth determining condition set, the HEQT split mode is unavailable; or if the current picture block meets none of conditions in the fourth determining condition set, the HEQT split mode is available.

The fourth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to maxRatio, where maxRatio is an integer greater than or equal to 1;

(6) at least one side length of the current picture block is greater than maxEQTSize, where maxEQTSize is an integer greater than or equal to 16;

(7) a height of the current picture block is less than or equal to minCUsize×2, or a width of the current picture block is equal to minCUSize, where minCUSize is a minimum CU side length;

(8) a ratio of a width to a height of the current picture block is greater than or equal to maxRatioEQT, where maxRatioEQT is an integer greater than or equal to 1;

(9) the current picture block exceeds a boundary of a picture in which the current picture block is located; and

(10) a quantity of layers obtained by performing binary tree split and/or extended quadtree split on the current picture block is greater than or equal to maxBTTDepth, where maxBTTDepth is an integer greater than or equal to 1.

In a possible implementation, the judging module is specifically configured to determine, based on the block information, whether the current picture block meets a condition in a fifth determining condition set, where if the current picture block meets at least one condition in the fifth determining condition set, the VEQT split mode is unavailable; or if the current picture block meets none of conditions in the fifth determining condition set, the VEQT split mode is available.

The fifth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to minRatio, where minRatio is greater than 0 and less than or equal to 1;

(6) at least one side length of the current picture block is greater than maxEQTSize, where maxEQTSize is an integer greater than or equal to 16;

(7) a width of the current picture block is less than or equal to minCUSize×2, or a height of the current picture block is equal to minCUSize, where minCUSize is a minimum CU side length;

(8) the current picture block exceeds a boundary of a picture in which the current picture block is located; and (9) a quantity of layers obtained by performing binary tree split and/or extended quadtree split on the current picture block is greater than or equal to maxBTTDepth, where maxBTTDepth is an integer greater than or equal to 1.

In a possible implementation, the judging module is specifically configured to determine, based on the block information, whether the current picture block meets a condition in a sixth determining condition set, where if the current picture block meets at least one condition in the sixth determining condition set, the QT split mode is unavailable; or if the current picture block meets none of conditions in the sixth determining condition set, the QT split mode is available.

The sixth determining condition set includes one or more of the following conditions:

(1) a size of the current picture block is 128×N, where N is a natural number less than 128;

(2) a size of the current picture block is M×128, where M is a natural number less than 128;

(3) a ratio of a width to a height of the current picture block is equal to maxRatio, where maxRatio is an integer greater than or equal to 1;

(4) a ratio of a width to a height of the current picture block is equal to minRatio, where minRatio is greater than 0 and less than or equal to;

(5) at least one side length of the current picture block is less than minQtSize, where minQtSize is an integer greater than or equal to 4;

(6) a quantity of layers obtained by performing binary tree split and/or extended quadtree split on the current picture block is greater than 0; and (7) the current picture block exceeds a bottom boundary or a right boundary of a picture in which the current picture block is located.

In a possible implementation, the determining module is configured to determine the split mode of the current picture block based on a determining result about whether the split mode in the set of optional split modes is available; or parse the bitstream to determine the split mode of the current picture block.

In a possible implementation, the determining module is specifically configured to: if the QT split mode is available, and all split modes in the set of optional split modes except the QT split mode are unavailable, determine that the split mode of the current picture block is the QT split mode; or if the QT split mode is available, and at least one split mode in the set of optional split modes other than the QT split mode is available, parse the bitstream to determine the split mode of the current picture block.

In a possible implementation, if the QT split mode is unavailable, the determining module is further configured to: if the non-split mode is available, and all split modes in the set of optional split modes except the non-split mode and the QT split mode are unavailable, determine that the split mode of the current picture block is the non-split mode; or if the non-split mode is available, and at least one split mode in the set of optional split modes other than the non-split mode and the QT split mode is available, parse the bitstream to determine the split mode of the current picture block.

In a possible implementation, the split module is specifically configured to: when the split mode of the current picture block is the non-split mode, determine that the current picture block is the one CU; or when the split mode of the current picture block is any split mode in the set of optional split modes except the non-split mode, split the current picture block based on the split mode of the current picture block, where if at least one side length of a sub-block obtained through split is T, and T is 4 or 8, the sub-block is the one CU; otherwise, the sub-block is further split.

According to a fourth aspect, an embodiment of this application provides a video decoding apparatus, including:

an obtaining module, configured to obtain block information of a current picture block; a default module, configured to determine a default split mode of the current picture block based on the block information; a split module, configured to split the current picture block by using the default split mode, to obtain a plurality of coding units CUs; and a decoding module, configured to parse a bitstream including the current picture block, to obtain decoding information of the plurality of CUs, and decode the CUs based on the decoding information, to obtain reconstructed blocks.

In a possible implementation, the default module is specifically configured to determine, based on the block information, whether the current picture block meets a condition in a seventh determining condition set, where if the current picture block meets at least one condition in the seventh determining condition set, the default split mode is a quadtree QT split mode.

The seventh determining condition set includes one or more of the following conditions:

(1) the current picture block exceeds a bottom-right boundary of a picture in which the current picture block is located; and (2) the current picture block is an I slice or an I frame, and a width and a height of the current picture block each are equal to maxLCU, where maxLCU includes 64, 128, or 256.

In a possible implementation, the default module is specifically configured to determine, based on the block information, whether the current picture block meets a condition in an eighth determining condition set, where if the current picture block meets at least one condition in the eighth determining condition set, the default split mode is a vertical binary tree VBT split mode.

The eighth determining condition set includes one or more of the following conditions:

(1) if the current picture block exceeds a right boundary of a picture in which the current picture block is located, and a width and a height of the current picture block do not meet the following: the width is equal to K, the height is equal to L, K is less than L, and K and L each are an integer greater than or equal to 32, the VBT split mode is forcibly used for the current picture block; and (2) if the current picture block exceeds a bottom boundary of a picture in which the current picture block is located, and a width and a height of the current picture block meet the following: the width is equal to K, the height is equal to L, K is greater than L, K and L each are an integer greater than or equal to 32, the VBT split mode is forcibly used for the current picture block.

In a possible implementation, the default module is specifically configured to determine, based on the block information, whether the current picture block meets a condition in a ninth determining condition set, where if the current picture block meets at least one condition in the ninth determining condition set, the default split mode is a horizontal binary tree HBT split mode.

The ninth determining condition set includes one or more of the following conditions:

(1) if the current picture block exceeds a bottom boundary of a picture in which the current picture block is located, and a width and a height of the current picture block do not meet the following: the width is equal to K, the height is equal to L, K is greater than L, and K and L each are an integer greater than or equal to 32, the HBT split mode is forcibly used for the current picture block; and (2) if the current picture block exceeds a right boundary of a picture in which the current picture block is located, and a width and a height of the current picture block meet the following: the width is equal to K, the height is equal to L, K is less than L, K and L each are an integer greater than or equal to 32, the HBT split mode is forcibly used for the current picture block.

In a possible implementation, the apparatus further includes: a judging module, configured to determine, based on the block information, whether a split mode in a set of optional split modes is available, where the set of optional split modes includes the VBT split mode, the HBT split mode, a horizontal extended quadtree HEQT split mode, a vertical extended quadtree VEQT split mode, and the QT split mode; and a determining module, configured to determine a split mode of the current picture block from a determined available split mode; where the split module is further configured to split the current picture block by using the split mode of the current picture block, to obtain the plurality of CUs; and the decoding module is further configured to parse the bitstream to obtain the decoding information of the plurality of CUs, and decode the CUs based on the decoding information, to obtain the reconstructed blocks.

According to a fifth aspect, an embodiment of this application provides a video decoding device. The device includes:

a memory, configured to store video data in a form of a bitstream; and a video decoder, configured to: obtain block information of a current picture block; determine, based on the block information, whether a split mode in a set of optional split modes is available, where the set of optional split modes includes a non-split mode; determine a split mode of the current picture block from a determined available split mode; obtain one CU or a plurality of CUs from the current picture block based on the split mode of the current picture block, where the one CU is obtained by applying the non-split mode to the current picture block; and parse the bitstream including the current picture block, to obtain decoding information of the one CU or the plurality of CUs, and decode the CU based on the decoding information, to obtain a reconstructed block.

According to a sixth aspect, an embodiment of this application provides a video decoding device, including a non-volatile memory and a processor that are coupled to each other. The processor invokes program code stored in the memory, to perform a part or all of steps of any method according to the first aspect or the second aspect.

According to a seventh aspect, an embodiment of this application provides a computer-readable storage medium. The computer-readable storage medium stores program code, where the program code includes instructions used to perform a part or all of steps of any method according to the first aspect or the second aspect.

According to an eighth aspect, an embodiment of this application provides a computer program product. When the computer program product is run on a computer, the computer is enabled to perform a part or all of steps of any method according to the first aspect or the second aspect.

It should be understood that, the technical solutions in the second aspect to the eighth aspect of this application are consistent with the technical solution in the first aspect. Beneficial effects achieved in the various aspects and corresponding feasible implementations are similar, and details are not described again.

BRIEF DESCRIPTION OF DRAWINGS

To describe the technical solutions in the embodiments of this application or in the background more clearly, the following describes the accompanying drawings for describing the embodiments of this application or the background.

DETAILED DESCRIPTION

Figure 1A:
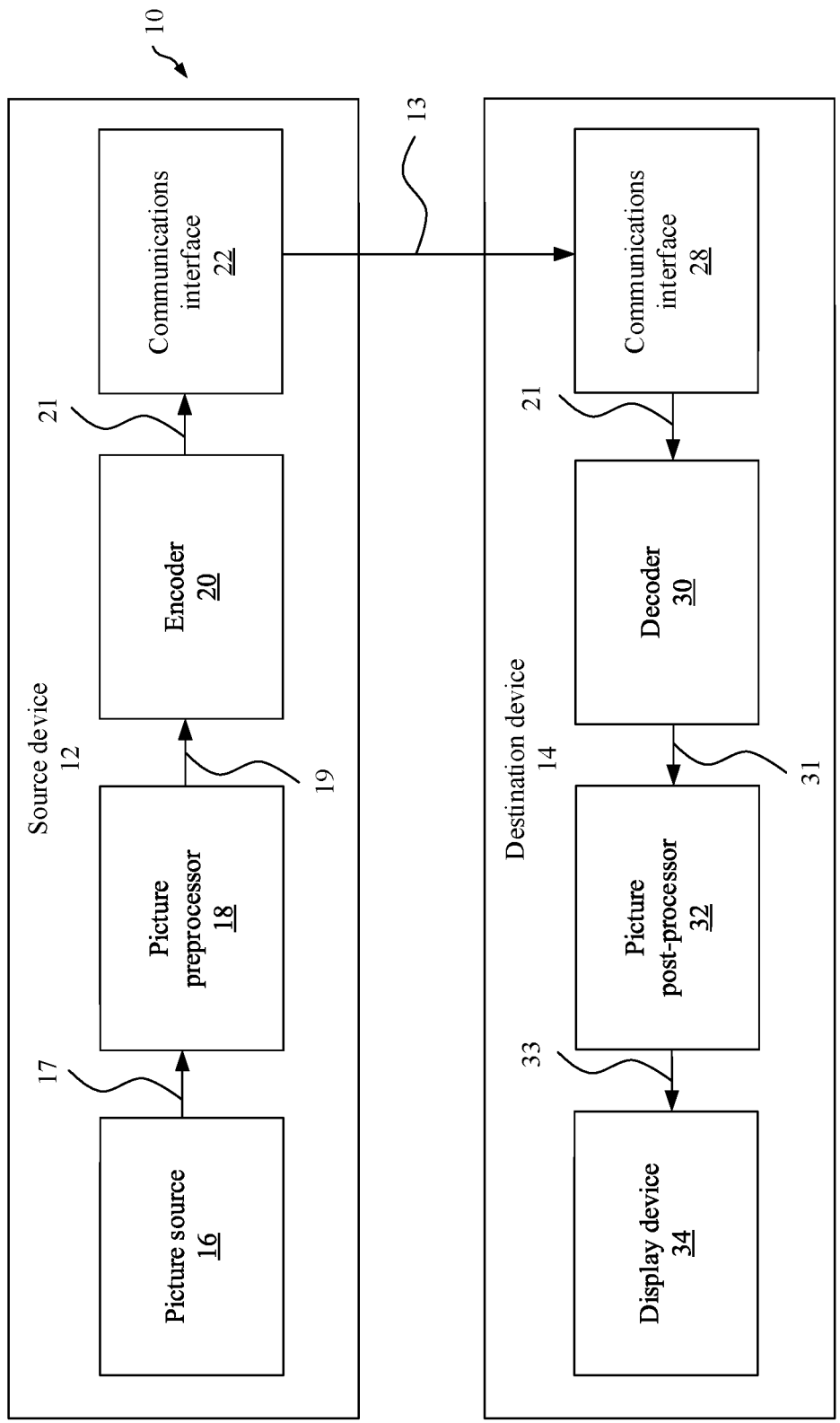
FIG. 1A is a block diagram of an example of a video encoding and decoding system 10 according to an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in another aspect, and may include structural or logical changes not depicted in the accompanying drawings. Therefore, the following detailed description shall not be understood in a limiting sense, and the scope of this application is defined by the appended claims. For example, it should be understood that disclosed content with reference to described methods is also applicable to a corresponding device or system configured to perform the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units; or a plurality of steps, each of which is used to perform one or more functionalities of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

The technical solutions in the embodiments of this application may not only be applied to existing video coding standards (for example, standards such as H.264 and high efficiency video coding (HEVC)), but also be applied to a future video coding standard (for example, the H.266 standard), or may be applied to an audio video coding (Audio Video coding Standard Workgroup of China, AVS) technical standard, for example, AVS3. Terms used in the embodiments of the present application are merely intended to explain specific embodiments of the present application, but are not intended to limit the present application. The following first briefly describes related concepts in the embodiments of this application.

Video coding typically refers to processing of a sequence of pictures, where the sequence of pictures forms a video or a video sequence. In the field of video coding, the terms "picture", "frame", and "image" may be used as synonyms. Video coding used in this specification indicates video encoding or video decoding. Video encoding is performed at a source side, and typically includes processing (for example, by compression) an original video picture to reduce an amount of data for representing the video picture, for more efficient storage and/or transmission. Video decoding is performed at a destination side, and typically includes inverse processing in comparison with an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures, the picture is further split into slices, and the slice is further split into blocks. Video coding is performed by block. In some new video coding standards, the concept "block" is further expanded. For example, in the H.264 standard, there is a macroblock (MB), and the macroblock may be further split into a plurality of prediction blocks (partition) that can be used for predictive coding. In the high efficiency video coding (HEVC) standard, a plurality of block units are classified based on functions by using basic concepts such as a coding unit (CU), a prediction unit (PU), and a transform unit (TU), and are described by using a new tree-based structure. For example, in the video coding standard, a frame of picture is partitioned into coding tree units (CTU) that do not overlap with each other, and then one CTU is split into several child nodes. These child nodes may be split into smaller child nodes based on a quadtree (QT). A smaller child node may be further split, to form a quadtree structure. If a node is not further split, the node is called a CU. The CU is a basic unit for splitting and encoding a coding picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a CTU is split into a plurality of CUs by using a quadtree structure represented as a coding tree. A decision on whether to code a picture region by using inter-picture (temporal) or intra-picture (spatial) prediction is made at a CU level. Each CU may be further split into one, two, or four PUs based on a PU split type In one PU, a same prediction process is applied, and related information is transmitted to a decoder on a PU basis. After a residual block is obtained by applying the prediction process based on the PU split type, the CU may be partitioned into TUs based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture can be reconstructed, that is, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, and the video picture cannot be completely reconstructed on a decoder side, that is, quality of a reconstructed video picture is lower or poorer than quality of the original video picture.

Several H.261 video coding standards are used for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, a subsequent block.

The following describes a system architecture to which the embodiments of this application are applied. FIG. 1A is a schematic block diagram of an example of a video encoding and decoding system 10 to which an embodiment of this application is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content coding, some text on a screen is also considered as a part of a to-be-coded picture or image), for example, a computer graphics processing unit configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be a local memory or, for example, a memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture element). The pixel in the array may also be referred to as a sample. A quantity of samples in horizontal and vertical directions (or axes) of the array or the picture defines a size and/or a resolution of the picture. For representation of a color, three color components are usually used. For example, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include a luma sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or denoising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bi-directional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform each embodiment described below, to implement decoder-side application of the video decoding method described in this application.

The picture post-processor 32 is configured to perform post-processing on the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, existence and (exact) division of functionalities of different units or functionalities of the source device 12 and/or the destination device 14 shown in FIG. 1A may vary depending on an actual device and application. The source device 12 and the destination device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSP), application-specific integrated circuits (ASIC), field programmable gate arrays (FPGA), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1A is merely an example and the technologies of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply encode data and store encoded data into the memory and/or retrieve data from the memory and decode the data.

Figure 1B:
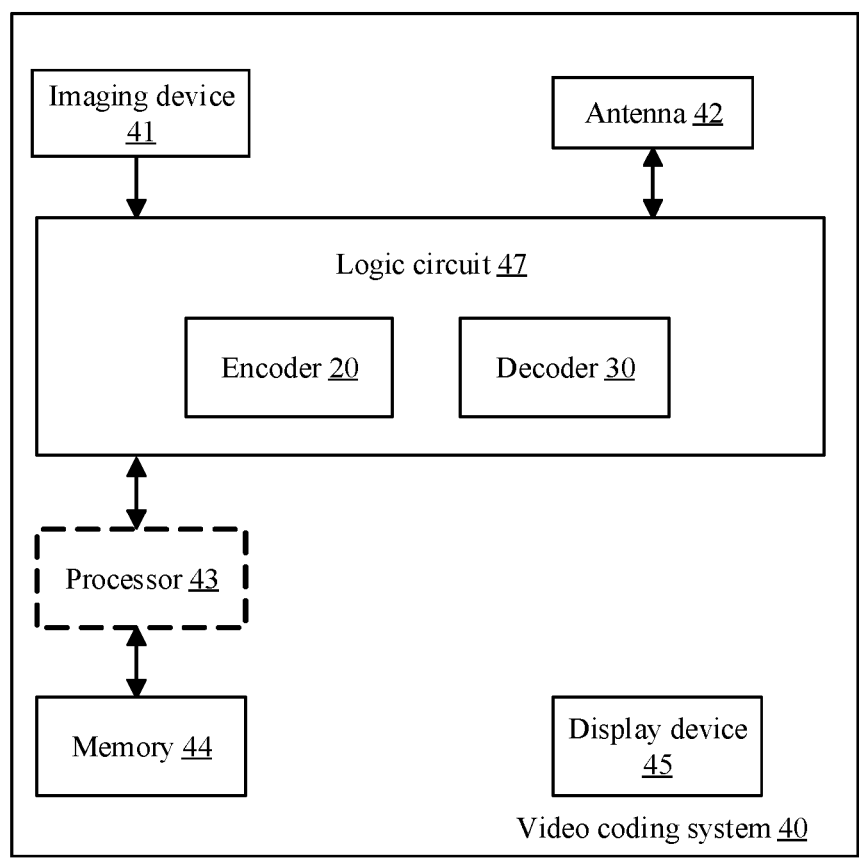
FIG. 1B is a block diagram of an example of a video coding system 40 according to an embodiment of this application.
Figure 2:
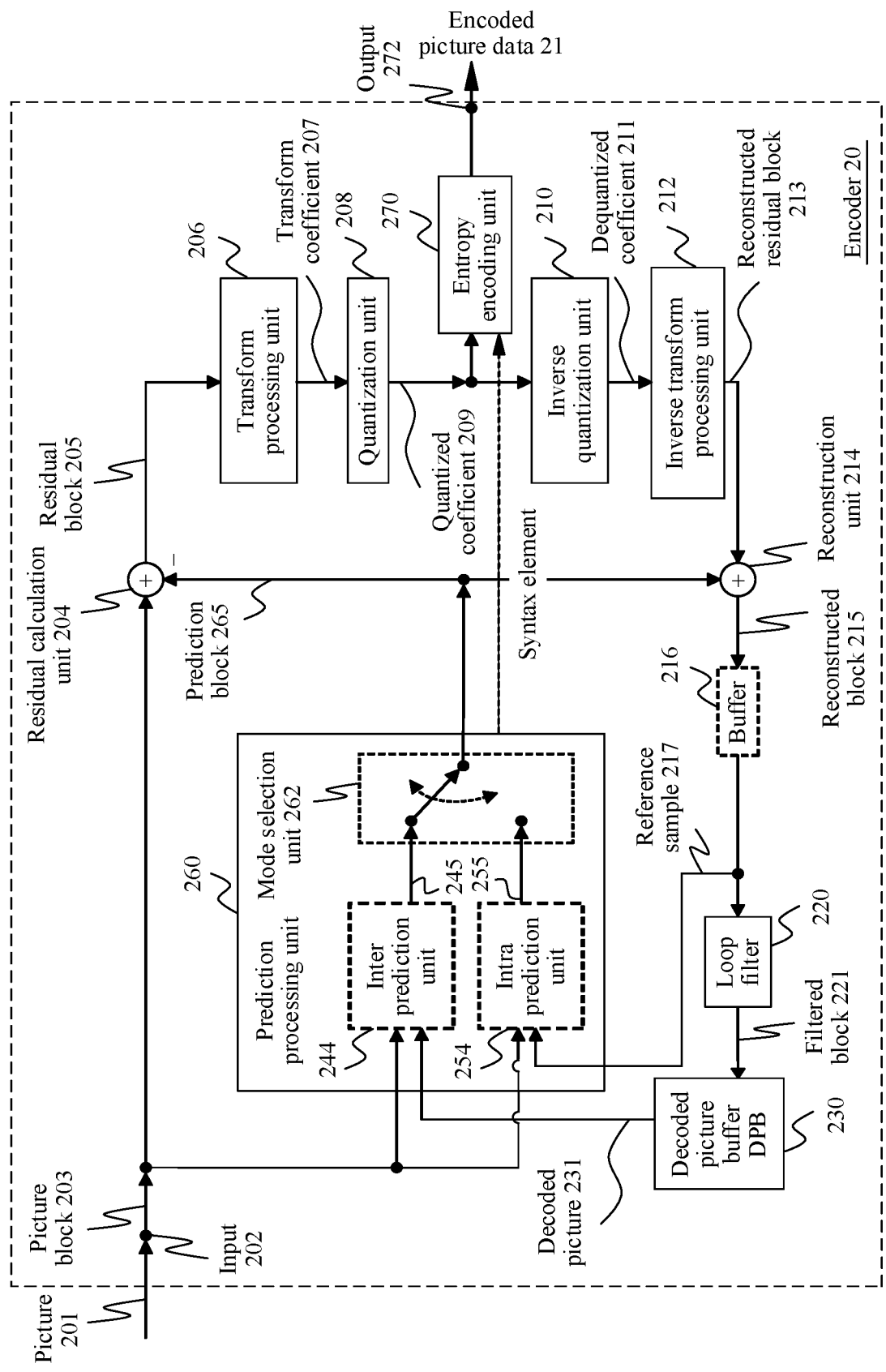
FIG. 2 is a block diagram of an example structure of an encoder 20 according to an embodiment of this application.
Figure 3:
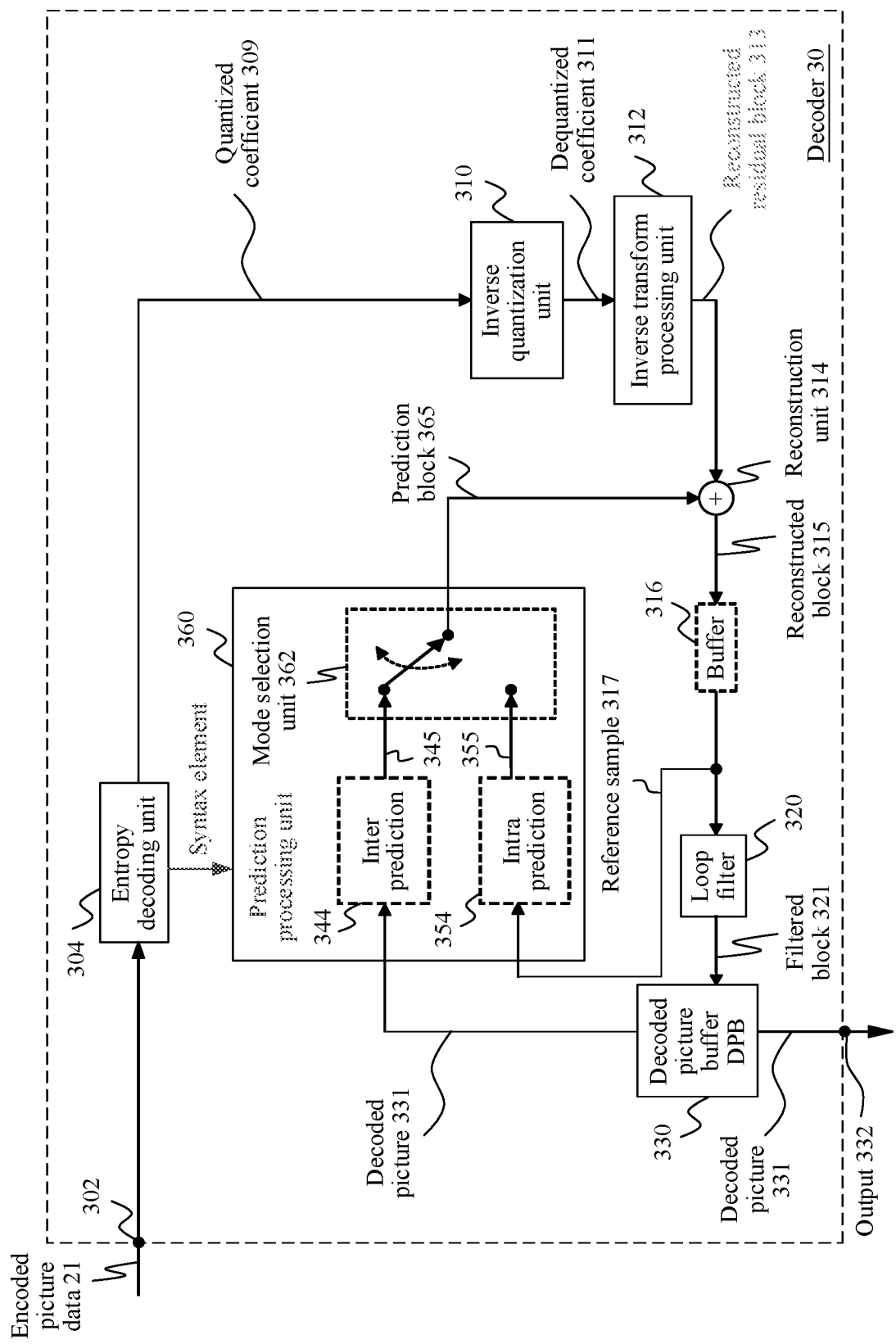
FIG. 3 is a block diagram of an example structure of a decoder 30 according to an embodiment of this application.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In an illustrated implementation, the video coding system 40 may include an imaging device 41, the encoder 20, the decoder 30 (and/or a video encoder/decoder implemented by a logic circuit 47), an antenna 42, one or more processors 43, one or more memories 44, and/or a display device 45.

As shown in FIG. 1B, the imaging device 41, the antenna 42, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include the encoder 20 or the decoder 30 in different examples.

In some examples, the antenna 42 may be configured to transmit or receive an encoded bitstream of video data. In addition, in some examples, the display device 45 may be configured to present the video data. In some examples, the logic circuit 47 may include application-specific integrated circuit (ASIC) logic, a graphics processing unit, a general-purpose processor, or the like. The video coding system 40 may alternatively include an optional processor 43. The optional processor 43 may similarly include application-specific integrated circuit (ASIC) logic, a graphics processing unit, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limitative example, the memory 44 may be implemented by a cache memory. In some examples, the logic circuit 47 may access the memory 44 (for example, for implementing a picture buffer). In other examples, the logic circuit 47 may include a memory (for example, a cache) for implementing a picture buffer.

In some examples, the encoder 20 implemented by using the logic circuit may include a picture buffer (which is implemented by using, for example, the memory 44) and a graphics processing unit. The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by using the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by using, for example, the memory 44) and a graphics processing unit. The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to a signaling syntax element, the decoder 30 may be configured to receive and parse the syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that the method described in the embodiments of this application is mainly used in an inter prediction process. This process is performed by both the encoder 20 and the decoder 30. The encoder 20 and the decoder 30 in the embodiments of this application may be, for example, an encoder/a decoder corresponding to a video standard protocol such as H.263, H.264, HEVV, MPEG-2, MPEG-4, VP8, or VP9, or a next-generation video standard protocol (such as H.266).

FIG. 2 is a schematic/conceptual block diagram of an example of an encoder 20 according to an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of the picture 201, for example, a picture in a sequence of pictures forming a video or a video sequence. The picture block 203 may also be referred to as a current picture block or a to-be-coded picture block, and the picture 201 may be referred to as a current picture or a to-be-coded picture (particularly in video coding, for distinguishing the current picture from other pictures, for example, previously encoded and/or decoded pictures in a same video sequence, that is, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is usually scaled by a factor. To preserve a norm of a residual block that is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. For example, a specific scale factor is specified for the inverse transform by, for example, the inverse transform processing unit 212 at the side of the decoder 30 (and a corresponding inverse transform by, for example, the inverse transform processing unit 212 at the side of the encoder 20), and correspondingly, a corresponding scale factor may be specified for the forward transform by the transform processing unit 206 at the side of the encoder 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (QP). For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step) or vice versa. The quantization may include division by a quantization step and corresponding quantization and/or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter using a fixed point approximation of an equation including division. An additional scale factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantization coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211 and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding a sample value of the reconstructed residual block 213 and a sample value of the prediction block 265, to obtain a reconstructed block 215 in the sample domain.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 ("loop filter" 220 for short) is configured to filter the reconstructed block 215 to obtain the filtered block 221, to smooth pixel transition or improve video quality. The loop filter unit 220 is intended to represent one or more loop filters including, for example, a deblocking filter, a sample-adaptive offset (SAO) filter, and another filter such as a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of memory devices such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, a previously reconstructed and filtered block 221, of a same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230; and is configured to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, to calculate the residual block 205 and reconstruct the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides a minimum signaling overhead (the minimum signaling overhead means better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least a part of decoded pictures stored in the DBP 230, as described above) and other inter prediction parameters, for example, depends on whether an entire reference picture or a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (AMVP) mode and a merge mode. In a specific implementation, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be used in the embodiments of this application.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include extracting or generating a prediction block based on a motion/block vector determined through motion estimation (interpolation may be performed at a sub-sample precision level). Interpolation filtering may generate additional pixel samples from known pixel samples. This potentially increases a quantity of candidate prediction blocks that may be used to code a picture block. Upon receiving a motion vector for a PU of the current picture block, the motion compensation unit may locate a prediction block to which the motion vector points in one reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, where the syntax elements include the inter prediction parameter (such as indication information of selection of an inter prediction mode used for prediction of the current block after traversal of a plurality of inter prediction modes). In a possible application scenario, if there is one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, a picture block 203 (a current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, that is, information indicating the selected intra-prediction mode for the block, to the entropy encoding unit 270. In an example, the intra prediction unit 254 may be configured to perform any combination of intra prediction technologies.

Specifically, the intra prediction unit 254 may transmit syntax elements to the entropy encoding unit 270, where the syntax elements include the intra prediction parameter (such as indication information of selection of an intra prediction mode used for prediction of the current block after traversal of a plurality of intra prediction modes). In a possible application scenario, if there is one intra prediction mode, the intra prediction parameter may alternatively not be carried in the syntax element. In this case, the decoder 30 may directly perform decoding in a default prediction mode.

The entropy encoding unit 270 is configured to apply (or skip applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Another structural variant of the video encoder 20 may be used to encode a video bitstream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

It should be understood that another structural variant of the video encoder 20 may be used to encode a video bitstream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be selectively enabled.

FIG. 3 is a schematic/conceptual block diagram of an example of a decoder 30 according to an embodiment of this application. The video decoder 30 is configured to receive encoded picture data (for example, an encoded bitstream) 21 encoded by, for example, the encoder 20, to obtain a decoded picture 231, as shown in FIG. 2. In a decoding process, the video decoder 30 receives video data from the video encoder 20, for example, an encoded video bitstream that represents a picture block of an encoded video slice, and an associated syntax element.

In the example of FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded coding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210, as shown in FIG. 2. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. A function of the inter prediction unit 344 may be similar to a function of the inter prediction unit 244, as shown in FIG. 2, and a function of the intra prediction unit 354 may be similar to a function of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra-prediction mode and data that is from a previously decoded block of a current frame or picture. When a video slice is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one reference picture in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of this application, the prediction processing unit 360 determines, by using some received syntax elements, a prediction mode (for example, intra or inter prediction) for encoding the video block of the video slice, an inter prediction slice type (for example, a B slice, a P slice, or a GPB slice), construction information of one or more of the reference picture lists for the slice, a motion vector for each inter encoded video block of the slice, an inter prediction status of each inter encoded video block of the slice, and other information, to decode the video block of the current video slice. In another example of this disclosure, syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient that is provided in the bitstream and that is decoded by the entropy decoding unit 304. An inverse quantization process may include: using a quantization parameter calculated by the video encoder 20 for each video block in the video slice, to determine a degree of quantization that is applied and, likewise, a degree of inverse quantization that is applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (that is, a reconstructed residual block 313) to the prediction block 365, for example, by adding a sample value of the reconstructed residual block 313 and a sample value of the prediction block 365, to obtain a reconstructed block 315 in a sample domain.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post-loop filter.

A decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be used to decode a compressed bitstream. For example, the decoder 30 may generate an output video bitstream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 that are combined into a single unit.

Specifically, in this embodiment of this application, the decoder 30 is configured to implement a video decoding method described in the following embodiments.

It should be understood that another structural variant of the video decoder 30 may be configured to decode an encoded video bitstream. For example, the video decoder 30 may generate an output video bitstream without processing by the filter 320. Alternatively, for some picture blocks or picture frames, the entropy decoding unit 304 of the video decoder 30 does not obtain quantized coefficients through decoding, and correspondingly, processing by the inverse quantization unit 310 and the inverse transform processing unit 312 is not required. The loop filter 320 is optional, and in a case of lossless compression, the inverse quantization unit 310 and the inverse transform processing unit 312 are optional. It should be understood that, in different application scenarios, the inter prediction unit and the intra prediction unit may be selectively enabled.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of the corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit width range. Assuming that an allowed bit width of the motion vector is bitDepth, a range of the motion vector is $-2^{bitDepth-1} \sim 2^{bitDepth-1}-1$. If bitDepth is 16, the value ranges from —32768 to 32767. If bitDepth is 18, the value ranges from −131072 to 131071. For another example, the value of the motion vector (for example, motion vectors MVs of four 4×4 subblocks in one 8×8 picture block) is constrained, so that a maximum difference between integer parts of the MVs of the four 4×4 subblocks does not exceed N pixels, for example, not exceed one pixel.

Figure 4:
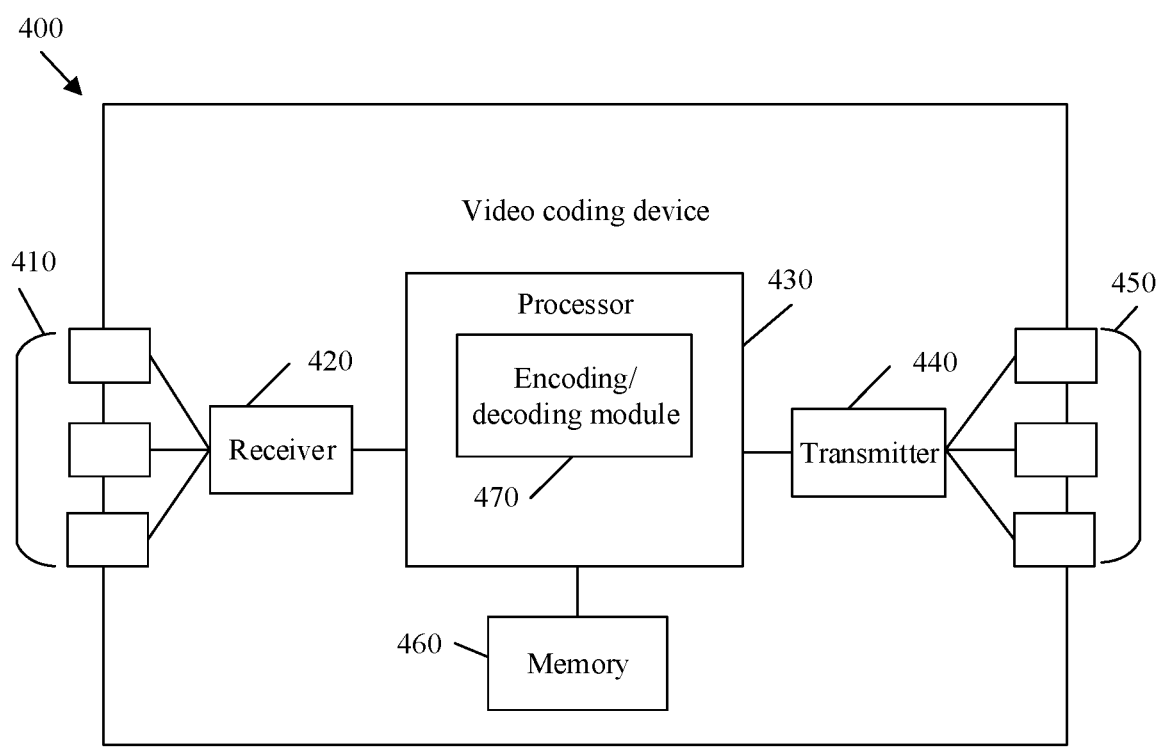
FIG. 4 is a block diagram of an example of a video coding device 400 according to an embodiment of this application.

FIG. 4 is a schematic diagram of a structure of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component that are coupled to the ingress port 410, the receiver unit 420, the transmitter unit 440, and the egress port 450 for egress or ingress of optical or electrical signals.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the video decoding method provided in the embodiments of the present application. For example, the encoding/decoding module 470 implements, processes, or provides various coding operations. Therefore, the encoding/decoding module 470 provides a substantial improvement to a function of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
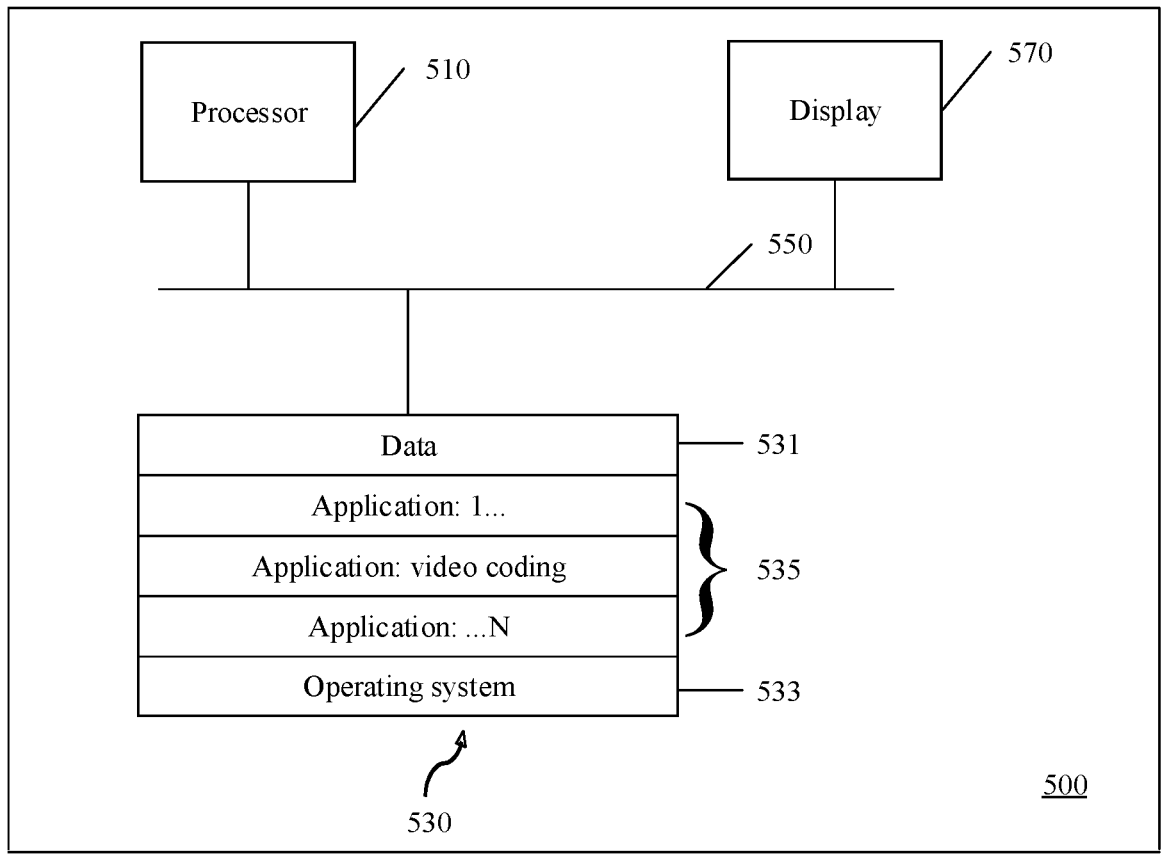
FIG. 5 is a block diagram of another example of an encoding apparatus or a decoding apparatus according to an embodiment of this application.

FIG. 5 is simplified block diagram of an apparatus 500 that may be used as either or both of the source device 12 and the destination device 14 in FIG. 1A according to an example embodiment. The apparatus 500 may implement the technologies of this application. In other words, FIG. 5 is a schematic block diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code, and the processor may invoke the program code stored in the memory, to perform various video encoding or decoding methods described in this application. To avoid repetition, details are not described herein again.

In this embodiment of this application, the processor 510 may be a central processing unit (CPU), or the processor 510 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 that are accessed by the processor 510 through the bus 550. The memory 530 may further include an operating system 533 and an application program 535. The application program 535 includes at least one program that allows the processor 510 to perform the video encoding or decoding method (in particular, the video decoding method described in this application) described in this application. For example, the application programs 535 may include applications 1 to N, and further includes a video encoding or decoding application (briefly referred to as a video coding application) that is used to perform the video encoding or decoding method described in this application.

The bus system 550 may further include a power bus, a control bus, a status signal bus, and the like, in addition to a data bus. However, for clear description, various types of buses are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

FIG. 6(a), FIG. 6(b), FIG. 6(c), FIG. 6(d), and FIG. 6(e) show a quadtree split mode, a binary tree split mode, and an extended quadtree split mode.

Figures 6A, 6B, 6C, 6D, 6E:
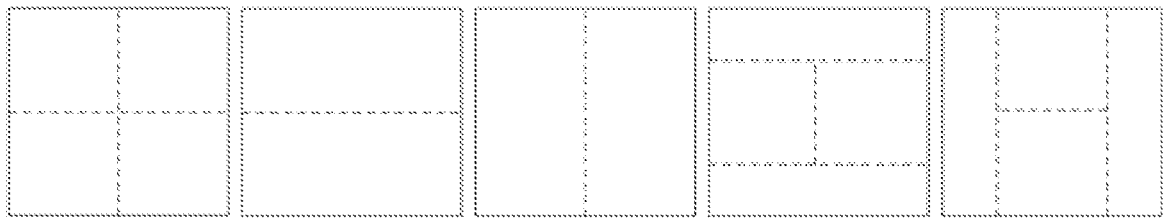
FIG. 6(a), FIG. 6(b), FIG. 6(c), FIG. 6(d), and FIG. 6(e) are schematic diagrams of a binary tree split mode, a quadtree split mode, and an extended quadtree split mode according to an embodiment of this application.

The QT is a tree structure, and indicates that one node can be split into four child nodes. In an existing video coding standard, a quadtree-based CTU split mode is used. In the quadtree-based CTU split mode, a CTU is used as a root node, and each node corresponds to a square region; and a node may not be split (in this case, a region corresponding to the node is a CU), or the node is split into four lower-level nodes, to be specific, the square region is split into four equal-sized square regions (the length and the width of each of the four equal-sized square regions are half of the length and the width of the square region before split), and each region corresponds to one node, as shown in FIG. 6(a).

The binary tree is a tree structure, and indicates that one node can be split into two child nodes. In an existing coding method in which the binary tree is used, a node on a binary tree structure may not be split, or the node is split into two lower-level nodes. There are two modes of splitting the node into two nodes: (1) horizontal binary split: A region corresponding to the node is split into two equal-sized regions: an upper region and a lower region, and each region corresponds to one node, as shown in FIG. 6(b); or (2) vertical binary split: A region corresponding to the node is split into two equal-sized regions: a left region and a right region, and each region corresponds to one node, as shown in FIG. 6(c).

An extended quadtree (EQT) is an H-shaped split structure, and one node can be split into four child nodes. There are two modes for splitting a node into four child nodes: (1) horizontal quad split: A region corresponding to the child node is split into four regions: an upper region, a middle left region, a middle right region and a lower region, where each region corresponds to one child node, and heights of the three regions: the upper region, the middle left region, the middle right region, and the lower region are respectively $\frac{1}{4}$, $\frac{1}{2}$, $\frac{1}{2}$, and $\frac{1}{4}$ of a height of the node, widths of the middle left region and the middle right region are respectively $\frac{1}{2}$ and $\frac{1}{2}$ of the height of the node, as shown in FIG. 6(d); or (2) vertical quad split: A region corresponding to the node is split into three regions: a left region, an upper middle region, a lower middle region, and a right region, where each region corresponds to one node, and widths of the three regions: the left region, the upper middle region, the lower middle region, and the right region are respectively $\frac{1}{4}$, $\frac{1}{2}$, $\frac{1}{2}$, and $\frac{1}{4}$ of a width of the node, widths of the upper middle region and the lower middle region are respectively $\frac{1}{2}$ and $\frac{1}{2}$ of a height of the node, as shown in FIG. 6(e). In an existing coding method in which the extended quadtree is used, a node on an extended quadtree structure may not be split, or the node is further split into lower-level nodes in a BT mode or an EQT mode.

In the H.265 video coding standard, a frame of picture is partitioned into non-overlapping coding tree units (CTU). A CTU size may be set to 64×64 (the CTU size may alternatively be set to another value, for example, the CTU size in JVET reference software JEM is increased to 128×128 or 256×256). A 64×64 CTU includes a rectangular pixel matrix with 64 columns and 64 pixels per column, and each pixel includes a luma component or/and a chroma component.

The quadtree (QT) based CTU split mode is used. A CTU is used as a root node of a quadtree, and the CTU is recursively split into several leaf nodes in the quadtree split mode. One node corresponds to one picture region. If a node is not split, the node is referred to as a leaf node, and a picture region corresponding to the node forms one CU. If a node is further split, a picture region corresponding to the node is split into four equal-sized regions (a length and a width of each of the four regions are respectively half of a length and a width of the split region), and each region corresponds to one node. Whether these nodes are to be further split needs to be separately determined. Whether a node is to be split is signaled by a split flag split_cu_flag that is in a bitstream and that corresponds to the node. A node A is split into four nodes Bi once, where i=0, 1, 2, 3. Bi is referred to as a child node of A, and A is referred to as a parent node of Bi. A quadtree depth (qtDepth) of the root node is 0. A quadtree depth of a node is a quadtree depth of a parent node of the node plus 1. For brevity of description, in the following, a size and a shape of a node are a size and a shape of a picture region corresponding to the node.

More specifically, for a 64×64 CTU node (whose quadtree depth is 0), based on split_cu_flag corresponding to the CTU node, split may not be performed and the CTU node may be one 64×64 CU, or the CTU node is split into four 32×32 nodes (whose quadtree depths are 1). Each of the four 32×32 nodes may be further split or not split based on split_cu_flag corresponding to the node. If a 32×32 node is further split, four 16×16 nodes (whose quadtree depths are 2) are generated. The rest may be deduced by analogy, until no node is further split. In this way, one CTU is split into a group of CUs. A minimum CU size is identified in a sequence parameter set (SPS). For example, an 8×8 CU is a minimum CU. In the foregoing recursive split process, if a size of a node is equal to the minimum CU size, the node is not further split by default, and a split flag of the node does not need to be included in the bitstream.

After a node is parsed to be a leaf node, the leaf node is a CU, coding information (including information such as a prediction mode and a transform coefficient of the CU, for example, a coding_unit( ) syntax structure in H.265) corresponding to the CU is further parsed. Then, decoding processing such as prediction, inverse quantization, inverse transform, and loop filtering is performed on the CU based on the coding information, to generate a reconstructed picture corresponding to the CU. The quadtree structure enables the CTU to be split into a group of CUs of appropriate sizes based on a local picture feature. For example, a smooth region is split into relatively large CUs, and a region with rich textures is split into relatively small CUs.

A mode of splitting a CTU into a group of CUs corresponds to a coding tree. A coding tree to be used for a CTU is usually determined by using a rate-distortion optimization (RDO) technology of an encoder. The encoder tries a plurality of CTU split modes, and each split mode corresponds to one rate-distortion cost (RD cost). The encoder compares RD costs of various attempted split modes to find a split mode with a minimum RD cost, and uses the split mode as an optimal split mode for the CTU to actually encode the CTU. The various CTU split modes tried by the encoder all need to satisfy a split rule specified by a decoder, so that the CTU split modes can be correctly identified by the decoder.

Based on the quadtree split, a binary tree (BT) split mode and a ternary tree (TT) split mode are added to versatile video coding test model (VTM) reference software. The VTM is a new codec reference software developed by the JVET.

The binary split is to split a node into two child nodes. There are two specific binary split modes:

(1) Horizontal binary split: A region corresponding to the node is split into two regions of a same size: an upper region and a lower region (to be specific, widths remain unchanged, and heights are a half of a height of the region before split), and each region corresponds to one node, as shown in FIG. 6(b).

(2) Vertical binary split: A region corresponding to the node is split into two regions of a same size: a left region and a right region (to be specific, heights remain unchanged, and widths are a half of a width of the region before split), as shown in FIG. 6(c).

The ternary split is to split a node into three child nodes. There are two specific ternary split modes:

(1) Horizontal ternary split: A region corresponding to the node is split into three regions: an upper region, a middle region, and a lower region, where each region corresponds to one node, and heights of the upper region, the middle region, and the lower region are respectively ¼, ½, and ¼ of a height of the node, as shown in FIG. 6(d).

(2) Vertical ternary split: A region corresponding to the node is split into three regions: a left region, a middle region, and a right region, where each region corresponds to one node, and widths of the left region, the middle region, and the right region are respectively ¼, ½, and ¼ of a height of the node, as shown in FIG. 6(e).

A QT plus BT/TT split mode (Quad Tree plus Multi-Type Tree, QT-MTT) is used in the VTM. More specifically, a CTU is split by using the QT mode, to generate a QT leaf node. A node in the QT may be further split into four QT child nodes by using the quadtree split mode, or one QT leaf node is generated without using the quadtree split mode. A QT leaf node is used as a root node of an MTT. A node in the MTT may be split into child nodes by using one of the four split modes: horizontal binary split, vertical binary split, horizontal ternary split, and vertical ternary split; or a node in the MTT is one MTT leaf node without being further split. A leaf node of the MTT is a coding unit CU.

Figure 7:
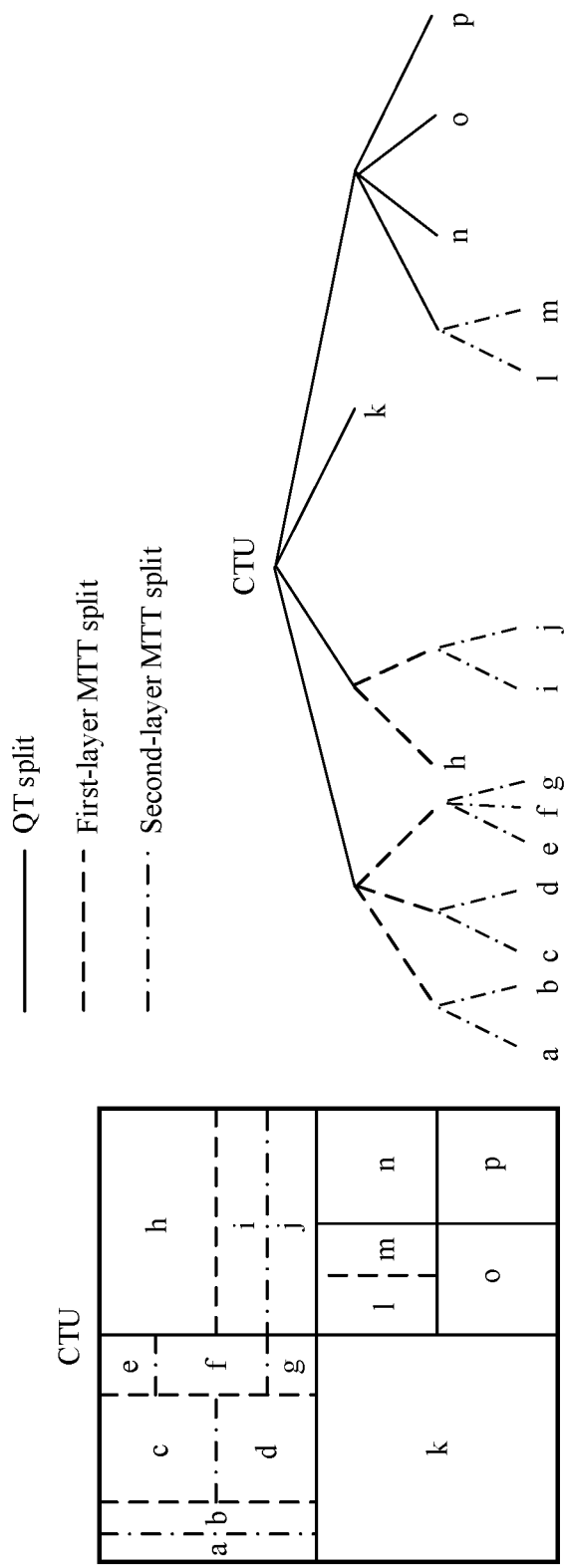
FIG. 7 is a schematic diagram of QT-MTT split according to implement an embodiment of this application.

FIG. 7 shows an example in which a CTU is split into 16 CUs from a to p by using a QT-MTT. In the right part in FIG. 7, each endpoint represents one node. Four lines connected to one node indicate quadtree split, two lines connected to one node indicate binary split, and three lines connected to one node indicate ternary split. A solid line indicates the QT split, a dashed line indicates first-layer split of a multi-type tree (MTT), and a dot-dashed line indicates second-layer split of the MTT. a to p represent 16 MTT leaf nodes, and each MTT leaf node is one CU. A CU split diagram shown in the left part in FIG. 7 is obtained by splitting a CTU in a split mode shown in the right part in FIG. 7.

In the QT-MTT split mode, each CU has a QT depth (Quad-tree depth) and an MTT depth (Multi-Type Tree depth). The QT depth indicates a QT depth of a QT leaf node to which the CU belongs, and the MTT depth indicates an MTT depth of an MTT leaf node to which the CU belongs. For a root node of a coding tree, a QT depth is 0 and an MTT depth is 0. If the QT split mode is used for a node on the coding tree, a QT depth of a child node obtained through split is a QT depth of the node plus 1, and an MTT depth remains unchanged. Similarly, if the MTT split mode (namely, one of the BT split node or the TT split mode) is used for a node on the coding tree, an MTT depth of a child node obtained through split is an MTT depth of the node plus 1, and a QT depth remains unchanged. For example, in FIG. 7, a QT depth of a, b, c, d, e, f, g, i, or j is 1, and an MTT depth is 2; a QT depth of h is 1, and an MTT depth is 1; a QT depth of n, o, or p is 2, and an MTT depth is 0; and a QT depth of 1 or m is 2, and an MTT depth is 1. If the CTU is split into one CU, a QT depth of the CU is 0, and an MTT depth is 0.

In a process of formulating the latest AVS3, on the basis of quadtree split, a binary tree (BT) split mode and an extended quadtree (EQT) split mode are added in the AVS3.

The binary split is to split a node into two child nodes. There are two specific binary split modes:

(1) Horizontal binary split (HBT): A region corresponding to the node is split into two regions of a same size: an upper region and a lower region (to be specific, widths remain unchanged, and heights are a half of a height of the region before split), and each region corresponds to one node, as shown in FIG. 6(b).

(2) Vertical binary split (VBT): A region corresponding to the node is split into two regions of a same size: a left region and a right region (to be specific, heights remain unchanged, and widths are a half of a width of the region before split), as shown in FIG. 6(c).

The extended quadtree split is to split a node into four child nodes. There are two specific extended quadtree split modes:

(1) Horizontal quad split (horizontal Extended Quad-Tree, HEQT): A region corresponding to the node is split into four regions: an upper region, a middle left region, and middle right region, and a lower region, where each region corresponds to one node, heights of the four regions: the upper region, the middle left region, the middle right region, and the lower region are respectively ¼, ½, ½, and ¼ of a height of the node, and widths of the middle left region and the middle right region are respectively ½ and ½ of the height of the node, as shown in FIG. 6(d).

(2) Vertical quad split (vertical Extended Quad-Tree, VEQT): A region corresponding to the node is split into four regions: a left region, an upper middle region, a lower middle region, and a right region, where each region corresponds to one node, widths of the three regions: the left region, the upper middle region, a lower middle region, and the right region are respectively ¼, ½, ½, and ¼ of a height of the node, and widths of the upper middle region and the lower middle region are respectively ½ and ½ of the height of the node, as shown in FIG. 6(e).

A QT plus BT/EQT split mode is used in the AVS3. To be specific, a node on a first-level coding tree can be split into child nodes by using the QT, and a leaf node of the first-level coding tree is a root node of a second-level coding tree; and a node on the second-level coding tree can be split into child nodes by using either of the BT split mode or the EQT split mode, and a leaf node of the second-level coding tree is a coding unit. It should be noted that when the BT split mode or the EQT split mode is used for a leaf node, the BT split mode or the EQT split mode can be used for a leaf node of the leaf node but the QT mode cannot be used.

After the foregoing various splits, a picture block at a location of a leaf node on a coding tree is used as a coding unit, and video coding mainly includes processes such as intra prediction, inter prediction, transform, quantization, entropy encoding, and in-loop filtering (which is mainly de-blocking filtering). After a picture is split into coding blocks, intra prediction or inter prediction is performed. Transform and quantization are performed after a residual is obtained. Finally, entropy encoding is performed and a bitstream is output. Herein, the coding block is an array with a size of M×N (M may be equal to N or not equal to N), where the array is constituted by pixels. In addition, a pixel value of each pixel location is known.

Intra prediction is to predict a pixel value of a pixel in a current coding block by using a pixel value of a pixel in a reconstructed region in a current picture.

Inter prediction is to search, in a reconstructed picture, for a matched reference block for a current coding block in a current picture, to obtain motion information of the current coding block; and then calculate prediction information or a prediction value (the information and the value are not distinguished in the following) of a pixel value of a pixel in the current coding block based on the motion information. A process of calculating the motion information is referred to as motion estimation (ME), and a process of calculating the prediction value of the pixel value of the pixel in the current coding block is referred to as motion compensation (MC).

It should be noted that the motion information of the current coding block includes prediction direction indication information (generally forward prediction, backward prediction, or bidirectional prediction), one or two motion vectors (MV) pointing to a reference block, and indication information (generally marked as a reference frame index, Reference index) of a picture in which the reference block is located.

Forward prediction is to select a reference picture from a forward reference picture set, to obtain a reference block for a current coding block. Backward prediction is to select a reference picture from a backward reference picture set, to obtain a reference block for a current coding block. Bidirectional prediction is to select a reference picture from each of a forward reference picture set and a backward reference picture set, to obtain reference blocks. When a bidirectional prediction method is used, the current coding block has two reference blocks. Each reference block needs to be indicated by using a motion vector and a reference frame index. Then, a prediction value of a pixel value of a pixel in a current block is determined based on pixel values of pixels in the two reference blocks.

In a motion estimation process, a plurality of reference blocks in the reference picture need to be tried for the current coding block, and which reference block or blocks are finally used for prediction is determined by using a rate distortion optimization (RDO) method or another method.

After the prediction information is obtained through intra prediction or inter prediction, residual information is obtained by subtracting the corresponding prediction information from the pixel value of the pixel in the current coding block. Then the residual information is transformed by using a method such as a discrete cosine transform (DCT). Then, a bitstream is obtained through quantization and entropy encoding. After a prediction signal and a reconstructed residual signal are added, a filtering operation needs to be performed, to obtain a reconstructed signal. The reconstructed signal is used as a reference signal for subsequent coding.

Decoding is an inverse process of encoding. For example, residual information is first obtained through entropy decoding, inverse quantization, and inverse transform, and a bitstream is decoded to determine whether intra prediction or inter prediction is used for a current coding block. If intra prediction is used, prediction information is constructed based on pixel values of pixels in a reconstructed region around the current coding block according to a used intra prediction method. If inter prediction is used, motion information needs to be obtained through parsing, a reference block is determined in a reconstructed picture based on the motion information obtained through parsing, and pixel values of pixels in the block are used as prediction information. This process is referred to as motion compensation (MC). After the prediction information and residual information are added, a filtering operation is performed to obtain reconstructed information.

The following embodiment describes a process of decoding a frame of picture based on a bitstream of the picture, and in particular, a process of determining a split mode for a picture block in the picture. For ease of description, a coordinate definition is set. For each VPDU in a current picture block, an example in which a vertex at a top-left corner of the VPDU is an origin of coordinates is used for description. A positive direction of a horizontal axis is rightward, and a positive direction of a vertical axis is downward.

Technical Solution in Embodiment 1 of this Application

When a frame of picture is to be coded, the picture is first split into picture blocks of a same size, where the picture blocks are referred to as largest coding units LCUs; and then a recursive split operation is performed on one LCU, so that one or more CUs may be obtained. The LCU has two sizes: 128×128 or 64×64, for selection. For example, in the following description, it is assumed that a size of the LCU is 128×128, and a principle of a size of the LCU being 64×64 is similar to a principle of the size of the LCU being 128×128. Details are not described again.

Figure 8:
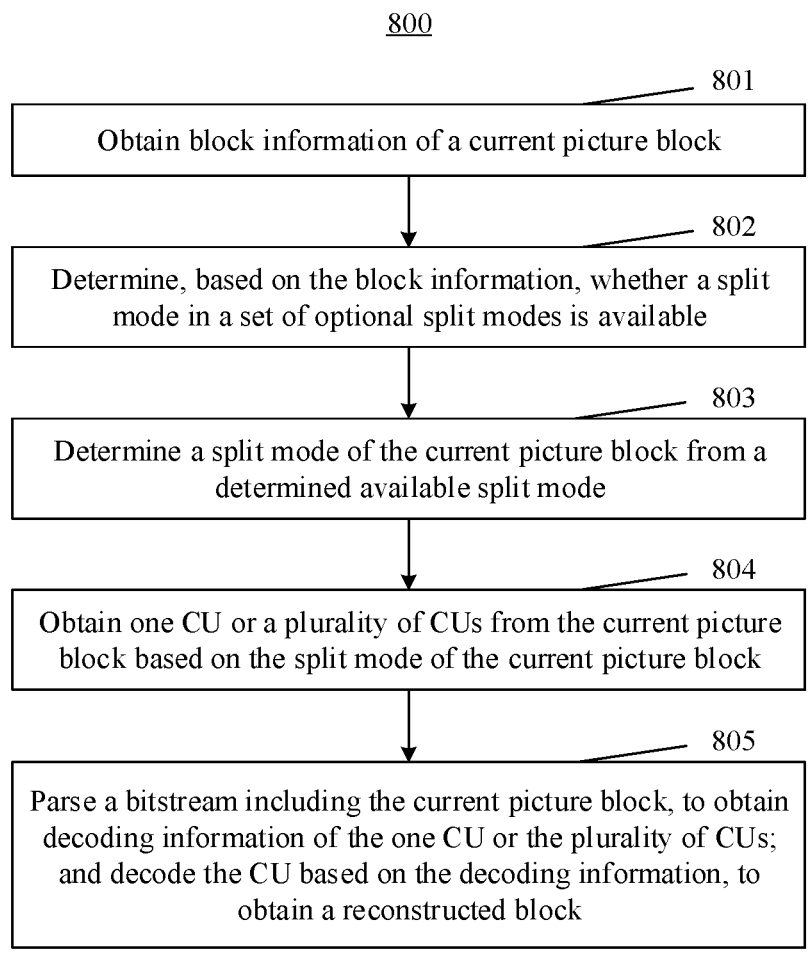
FIG. 8 is a schematic flowchart of a video decoding method according to an embodiment of this application.

FIG. 8 is a flowchart of a video decoding method according to an embodiment of this application. A process 800 may be performed by a video decoder 30. The process 800 is described as a series of steps or operations. It should be understood that the steps or operations of the process 800 may be performed in various sequences and/or performed simultaneously, and are not limited to an execution sequence shown in FIG. 8. As shown in FIG. 8, the method includes the following steps.

At step 801: obtain block information of a current picture block.

The current picture block is a picture block obtained by splitting a current picture, and corresponds to a node on a coding tree of the current picture. The current picture block may be a CTU of the current picture, or may be a sub-block obtained by splitting the CTU by using the CTU as a root node, or may be a lower-level sub-block obtained by splitting a certain-level sub-block by using the certain-level sub-block as a root node. The block information of the current picture block may include size information of the current picture block, for example, a width of the current picture block, a height of the current picture block, or a region, obtained based on a width and a height, of the current picture block; and may further include coordinates of a pixel in the current picture block, where an top-left vertex of the current picture is used as an origin of the coordinates of the pixel, a rightward direction is a positive direction of an x-axis, and a downward direction is a positive direction of a y-axis. The block information may further include other picture-related information corresponding to the current picture block. The block information can be obtained by parsing a bitstream of the current picture.

At step 802: determine, based on the block information, whether a split mode in a set of optional split modes is available.

A set of optional split modes of a picture block includes at least one of split modes, for example, a VBT split mode, an HBT split mode, a VEQT split mode, an HEQT split mode, and a QT split mode. The set of optional split modes in this embodiment of this application further includes a non-split mode, that is, the current picture block is a leaf node, and is used as a CU for encoding and decoding. It should be noted that the set of optional split modes may further include another split mode. This is not limited in this application.

In this embodiment of this application, which split modes are available and which split modes are unavailable in the set of optional split modes may be determined based on the block information of the current picture block. If one split mode is available, a decoding device can normally decode the current picture block by using this split mode.

The following describes, as an example, a process in which the decoding device determines whether a split mode in the set of optional split modes is available in this application. It should be noted that the process includes but is not limited to a method of a condition set, and a plurality of conditions included in the condition set are not sequential.

Determining whether the non-split mode is available includes: The decoding device determines, based on the block information, whether the current picture block meets a condition in a first determining condition set. If the current picture block meets at least one condition in the first determining condition set, the non-split mode is unavailable, and it is determined that a variable allow_NoSplit=0; or if the current picture block meets none of conditions in the first determining condition set, the non-split mode is available, and it is determined that a variable allow_NoSplit=1.

The first determining condition set includes one or more of the following conditions. For example, the first determining condition set may be a combination of conditions (1) and (3), or a combination of conditions (1), (2), and (3).

(1) The current picture block is an I slice or an I frame, and a side length of the current picture block is equal to MaxLCU, where MaxLCU is a side length of a largest coding unit LCU, and MaxLCU is 128 herein.

(2) A ratio of a long side to a short side of the current picture block is greater than maxAspectRatio, where maxAspectRatio is an integer greater than or equal to 1, for example, 4.

(3) The current picture block exceeds a boundary of a picture in which the current picture block is located.

It should be noted that, that the current picture block exceeds a boundary of a picture in which the current picture block is located in this application does not mean that there is a pixel value within a scope that is of the current picture block and that exceeds the boundary of the picture, but means that a maximum coordinate value in one direction or two directions in the current picture block exceeds a coordinate value of the boundary of the picture in the same direction or directions.

(4) A width of the current picture block is greater than pipelineSize, and a height of the current picture block is less than pipelineSize, where pipelineSize is an integer greater than or equal to 16, for example, 64.

(5) A height of the current picture block is greater than pipelineSize, and a width of the current picture block is less than pipelineSize.

Determining whether the HBT split mode is available includes: The decoding device determines, based on the block information, whether the current picture block meets a condition in a second determining condition set. If the current picture block meets at least one condition in the second determining condition set, the HBT split mode is unavailable, and it is determined that a variable allowSplitBtHor=0; or if the current picture block meets none of conditions in the second determining condition set, the HBT split mode is available, and it is determined that a variable allowSplitBtHor=1.

The second determining condition set includes one or more of the following conditions. For example, the second determining condition set may be a combination of conditions (1) and (5), or a combination of conditions (1), (2), and (3).

(1) The current picture block is an I slice or an I frame, and a side length of the current picture block is equal to MaxLCU, where MaxLCU is a side length of an LCU, and MaxLCU is 128 herein.

(2) A size of the current picture block is 128×N, where N is a natural number less than 128, for example, N includes 64, 32, 16, 8, or 4, and a default value is 64.

(3) The current picture block exceeds a bottom boundary of a picture in which the current picture block is located, a width of the current picture block is greater than K, and a height of the current picture block is equal to K, where K includes 128, 64, 32, 16, 8, or 4.

(4) A width of the current picture block is greater than pipelineSize, and a height of the current picture block is less than or equal to pipelineSize, where pipelineSize is an integer greater than or equal to 1, for example, 64.

(5) The current picture block exceeds a right boundary or a bottom-right boundary of a picture in which the current picture block is located.

(6) At least one side length of the current picture block is greater than maxBTSize, where maxBTSize is an integer greater than or equal to 8, for example, 128.

(7) A height of the current picture block is equal to a minimum CU side length minCUSize, for example, minCUSize is 4 or 8.

(8) The current picture block does not exceed a boundary of a picture in which the current picture block is located, and a ratio of a width to a height of the current picture block is greater than or equal to maxRatio, where maxRatio is an integer greater than or equal to 1, for example, 8 or 4.

(9) A ratio of a width to a height of the current picture block is greater than or equal to maxRatio, where maxRatio is an integer greater than or equal to 1.

(10) A quantity of layers obtained by performing binary tree split and/or extended quadtree split on the current picture block is greater than or equal to maxBTTDepth, where maxBTTDepth is an integer greater than or equal to 1, for example, 10.

Determining whether the VBT split mode is available includes: The decoding device determines, based on the block information, whether the current picture block meets a condition in a third determining condition set. If the current picture block meets at least one condition in the third determining condition set, the VBT split mode is unavailable, and it is determined that a variable allowSplitBtVer=0; or if the current picture block meets none of conditions in the third determining condition set, the VBT split mode is available, and it is determined that a variable allowSplitBtVer=1.

The third determining condition set includes one or more of the following conditions. For example, the third determining condition set may be a combination of conditions (1) and (3), or a combination of conditions (1), (2), and (3).

(1) The current picture block is an I slice or an I frame, and a side length of the current picture block is equal to MaxLCU, where MaxLCU is a side length of an LCU, and MaxLCU is 128 herein.

(2) A size of the current picture block is M×128, where M is a natural number less than 128, for example, M includes 64, 32, 16, 8, or 4, and a default value is 64.

(3) The current picture block exceeds a bottom boundary or a bottom-right boundary of a picture in which the current picture block is located.

(4) The current picture block exceeds a right boundary of a picture in which the current picture block is located, a width of the current picture block is equal to K, and a height of the current picture block is greater than K, where K includes 128, 64, 32, 16, 8, or 4.

(5) A ratio of a width to a height of the current picture block is equal to minRatio, where minRatio is greater than 0 and less than or equal to 1, for example, ⅛ or ¼.

(6) At least one side length of the current picture block is greater than maxBTSize, where maxBTSize is an integer greater than or equal to 16, for example, 128.

(7) A width of the current picture block is equal to a minimum CU side length minCUSize, for example, minCUSize is 4 or 8.

(8) The current picture block does not exceed a boundary of a picture in which the current picture block is located, and a ratio of a height to a width of the current picture block is greater than or equal to maxRatio, where maxRatio is an integer greater than or equal to 1, for example, 4.

(9) A height of the current picture block is greater than pipelineSize, and a width of the current picture block is less than or equal to pipelineSize, where pipelineSize is an integer greater than or equal to 1, for example, 64.

(10) A quantity of layers obtained by performing binary tree split and/or extended quadtree split on the current picture block is greater than or equal to maxBTTDepth, where maxBTTDepth is an integer greater than or equal to 1, for example, 10.

An initial value of the quantity of layers obtained by performing binary tree split and/or extended quadtree split on the current picture block is greater than 0. Each time the BT split mode is used for the current picture block, a value of the quantity of layers is increased by 1.

Determining whether the HEQT split mode is available includes: The decoding device determines, based on the block information, whether the current picture block meets a condition in a fourth determining condition set. If the current picture block meets at least one condition in the fourth determining condition set, the HEQT split mode is unavailable, and it is determined that a variable allowSplitaqtHor=0; or if the current picture block meets none of conditions in the fourth determining condition set, the HEQT split mode is available, and it is determined that a variable allowSplitaqtHor=1.

The fourth determining condition set includes one or more of the following conditions. For example, the fourth determining condition set may be a combination of conditions (1) and (4), or a combination of conditions (1), (4), and (5).

(1) The current picture block is an I slice or an I frame, and a side length of the current picture block is equal to MaxLCU, where MaxLCU is a side length of an LCU, and MaxLCU is 128 herein.

(2) A size of the current picture block is 128×N, where N is a natural number less than 128, for example, N includes 64, 32, 16, 8, or 4, and a default value is 64.

(3) A size of the current picture block is M×128, where M is a natural number less than 128, for example, M includes 64, 32, 16, 8, or 4, and a default value is 64.

(4) The current picture block exceeds a boundary of a picture in which the current picture block is located, and a size of the current picture block is 128×N or M×128, where M and N each are a natural number less than 128, for example, M and N each include 64, 32, 16, 8, or 4, and default values are both 64.

(5) A ratio of a width to a height of the current picture block is equal to maxRatio, where maxRatio is an integer greater than or equal to 1, for example, 8 or 4.

(6) At least one side length of the current picture block is greater than maxEQTSize, where maxEQTSize is an integer greater than or equal to 16, for example, 64.

(7) A height of the current picture block is less than or equal to minCUSize×2, or a width of the current picture block is equal to minCUSize, where minCUSize is a minimum CU side length, for example, 4 or 8.

(8) A ratio of a width to a height of the current picture block is greater than or equal to maxRatioEQT, where maxRatioEQT is an integer greater than or equal to 1, for example, 2.

(9) The current picture block exceeds a boundary of a picture in which the current picture block is located.

(10) A quantity of layers obtained by performing binary tree split and/or extended quadtree split on the current picture block is greater than or equal to maxBTTDepth, where maxBTTDepth is an integer greater than or equal to 1, for example, 10.

An initial value of the quantity of layers obtained by performing binary tree split and/or extended quadtree split on the current picture block is greater than 0. Each time the HEQT split mode is used for the current picture block, a value of the quantity of layers is increased by 1.

Determining whether the VEQT split mode is available includes: The decoding device determines, based on the block information, whether the current picture block meets a condition in a fifth determining condition set. If the current picture block meets at least one condition in the fifth determining condition set, the VEQT split mode is unavailable, and it is determined that a variable allowSplitEqtVer=0; or if the current picture block meets none of conditions in the fifth determining condition set, the VEQT split mode is available, and it is determined that a variable allowSplitEqtVer=1.

The fifth determining condition set includes one or more of the following conditions. For example, the fifth determining condition set may be a combination of conditions (1) and (4), or a combination of conditions (1), (4), and (5).

(1) The current picture block is an I slice or an I frame, and a side length of the current picture block is equal to MaxLCU, where MaxLCU is a side length of an LCU, and maxLCU is 128 herein.

(2) A size of the current picture block is 128×N, where N is a natural number less than 128, for example, N includes 64, 32, 16, 8, or 4, and a default value is 64.

(3) A size of the current picture block is M×128, where M is a natural number less than 128, for example, M includes 64, 32, 16, 8, or 4, and a default value is 64.

(4) The current picture block exceeds a boundary of a picture in which the current picture block is located, and a size of the current picture block is 128×N or M×128, where M and N each are a natural number less than 128, for example, M and N each include 64, 32, 16, 8, or 4, and default values are both 64.

(5) A ratio of a width to a height of the current picture block is equal to minRatio, where minRatio is greater than 0 and less than or equal to 1, for example, ⅛ or ¼.

(6) At least one side length of the current picture block is greater than maxEQTSize, where maxEQTSize is an integer greater than or equal to 16, for example, 64.

(7) A width of the current picture block is less than or equal to minCUSize×2, or a height of the current picture block is equal to minCUSize, where minCUSize is a minimum CU side length, for example, 4 or 8.

(8) The current picture block exceeds a boundary of a picture in which the current picture block is located.

(9) A quantity of layers obtained by performing binary tree split and/or extended quadtree split on the current picture block is greater than or equal to maxBTTDepth, where maxBTTDepth is an integer greater than or equal to 1, for example, 10.

An initial value of the quantity of layers obtained by performing binary tree split and/or extended quadtree split on the current picture block is greater than 0. Each time the VEQT split mode is used for the current picture block, a value of the quantity of layers is increased by 1.

Determining whether the QT split mode is available includes: The decoding device determines, based on the block information, whether the current picture block meets a condition in a sixth determining condition set. If the current picture block meets at least one condition in the sixth determining condition set, the QT split mode is unavailable, and it is determined that a variable allowSplitQt=0; or if the current picture block meets none of conditions in the sixth determining condition set, the QT split mode is available, and it is determined that a variable allowSplitQt=1.

The sixth determining condition set includes one or more of the following conditions. For example, the sixth determining condition set may be a combination of conditions (5) and (7), or a combination of conditions (1), (2), and (6).

(1) A size of the current picture block is 128×N, where N is a natural number less than 128, for example, N includes 64, 32, 16, 8, or 4, and a default value is 64.

(2) A size of the current picture block is M×128, where M is a natural number less than 128, for example, M includes 64, 32, 16, 8, or 4, and a default value is 64.

(3) A ratio of a width to a height of the current picture block is equal to maxRatio, where maxRatio is an integer greater than or equal to 1, for example, 8 or 4.

(4) A ratio of a width to a height of the current picture block is equal to minRatio, where minRatio is greater than 0 and less than or equal to, for example, ⅛ or ¼.

(5) At least one side length of the current picture block is less than minQtSize, where minQtSize is an integer greater than or equal to 4; and 64, 32, 16, 8, 4, or the like may be selected, and a default value is 4.

(6) A quantity of layers obtained by performing binary tree split and/or extended quadtree split on the current picture block is greater than 0.

(7) The current picture block exceeds a bottom boundary or a right boundary of a picture in which the current picture block is located.

At step 803: determine a split mode of the current picture block from a determined available split mode.

The decoding device may determine the split mode of the current picture block based on a determining result about whether the split mode in the set of optional split modes is available. To be specific, if the QT split mode is available, and all split modes in the set of optional split modes except the QT split mode are unavailable, the split mode of the current picture block is the QT split mode; or if the QT split mode is available, and at least one split mode in the set of optional split modes other than the QT split mode is available, the bitstream is parsed to determine the split mode of the current picture block. When the QT split mode is unavailable, if the non-split mode is available, and all split modes in the set of optional split modes except the non-split mode and the QT split mode are unavailable, the split mode of the current picture block is the non-split mode; or if the non-split mode is available, and at least one split mode in the set of optional split modes other than the non-split mode and the QT split mode is available, the bitstream is parsed to determine the split mode of the current picture block.

For example, it is assumed that a variable split_cu_flag=1 indicates that the QT split mode is used for the current picture block, and the variable split_cu_flag=0 indicates that the QT split mode is not used for the current picture block; and bt_split_flag=1 indicates that the BT split mode or the EQT split mode is used for the current picture block, and bt_split_flag=0 indicates that the BT split mode or the EQT split mode is not used for the current picture block. After step 802, in this embodiment of this application, the split mode of the current picture block may be determined by using the following method. It should be noted that the foregoing variables are used as an example for description, and this is not specifically limited in this application.

(a) If allowSplitQt=1, and at least one of allow_NoSplit, allowSplitBtHor, allowSplitBtVer, allowSplitaqtHor, and allowSplitEqtVer is 1, the bitstream is parsed to determine split_cu_flag.

(b) If allowSplitQt=1, and allow NoSplit, allowSplitBtHor, allowSplitBtVer, allowSplitaqtHor, and allowSplitEqtVer are all 0, the QT split mode is used for the current picture block, and split_cu_flag=1 may be obtained.

(c) If allowSplitQt=0, the QT split mode is not used for the current picture block, and split_cu_flag=0 may be obtained.

If split_cu_flag=0, perform the following steps.

(d) If allow NoSplit=1, and at least one of allowSplitBtHor, allowSplitBtVer, allowSplitaqtHor, and allowSplitEqtVer is 1, the bitstream is parsed to determine bt_split_flag.

(e) If allow NoSplit=1, and allowSplitBtHor, allowSplitBtVer, allowSplitaqtHor, and allowSplitEqtVer are all 0, the non-split mode is used for the current picture block, and bt_split_flag=0 may be obtained.

(f) If allow NoSplit=0, the non-split mode is not used for the current picture block, and bt_split_flag=1 may be obtained.

If bt_split_flag=1 is obtained, perform the following steps.

(g) Whether the split mode used for the current picture block is vertical split or horizontal split in BT or EQT is determined based on allowSplitBtHor, allowSplitBtVer, allowSplitaqtHor, and allowSplitEqtVer. The following provides an example of a determining method.

If allowSplitBtHor=1, and allowSplitBtVer, allowSplitaqtHor, and allowSplitEqtVer are all 0, the HBT split mode is used for the current picture block.

If allowSplitBtVe=1, and allowSplitBtHor, allowSplitaqtHor, and allowSplitEqtVer are all 0, the VBT split mode is used for the current picture block.

If allowSplitaqtHor=1, and allowSplitBtHor, allowSplitBtVer, and allowSplitEqtVer are all 0, the HEQT split mode is used for the current picture block.

If allowSplitEqtVer=1, and allowSplitBtHor, allowSplitBtVer, and allowSplitaqtHor are all 0, the VEQT split mode is used for the current picture block.

The decoding device may alternatively parse the bitstream to determine the split mode of the current picture block. For example, whether a split type is BT or EQT is first obtained through parsing, and then whether a split direction is vertical split or horizontal split is obtained through parsing. Alternatively, a split direction may be first obtained through parsing, and then a split type is obtained through parsing. The following uses an example in which the split type is first obtained through parsing and then the split direction is obtained through parsing for description.

The decoding device parses the bitstream to obtain bqtSplitTypeFlag, and then parses the bitstream to obtain bqtSplitDirFlag. bqtSplitTypeFlag is used to indicate a split type of the current picture block. bqtSplitTypeFlag=1 indicates that the BT split is used for the current picture block, and bqtSplitTypeFlag=0 indicates that the EQT split is used for the current picture block. bqtSplitDirFlag is used to indicate a split direction of the current picture block. bqtSplitDirFlag=1 indicates that vertical split is used for the current picture block, and bqtSplitDirFlag=0 indicates that horizontal split is used for the current picture block.

If bqtSplitTypeFlag=1, and bqtSplitDirFlag=1, the VBT split mode is used for the current picture block.

If bqtSplitTypeFlag=1, and bqtSplitDirFlag=0, the HBT split mode is used for the current picture block.

If bqtSplitTypeFlag=0, and bqtSplitDirFlag=1, the VEQT split mode is used for the current picture block.

If bqtSplitTypeFlag=0, and bqtSplitDirFlag=0, the HEQT split mode is used for the current picture block.

At step 804: obtain one CU or a plurality of CUs from the current picture block based on the split mode of the current picture block.

When the split mode of the current picture block is the non-split mode, it is determined that the current picture block is the one CU; or when the split mode of the current picture block is any split mode in the set of optional split modes except the non-split mode, the current picture block is split based on the split mode of the current picture block, where if at least one side length of a sub-block obtained through split is T, and T is 4 or 8, the sub-block is the one CU; otherwise, a split mode is further determined for the sub-block in a manner of steps 802 and 803.

At step 805: parse a bitstream including the current picture block, to obtain decoding information of the one CU or the plurality of CUs; and decode the CU based on the decoding information, to obtain a reconstructed block.

The decoding device parses a syntax element of each CU from a bitstream of the picture in which the current picture block is located, to obtain prediction information and residual information of the CU, and performs inter prediction processing or intra prediction processing on the CU in a prediction mode of the CU, to obtain an inter prediction picture or an intra prediction picture of the CU. Then, inverse quantization processing and inverse transform processing are performed on a transform coefficient based on the residual information of the CU, to obtain a residual picture; and the residual picture and the prediction picture of the CU are added, to obtain a reconstructed block of the CU.

According to this application, when the split mode of the current picture block is to be obtained, whether the split mode is available is determined, so as to avoid transmitting information about the split mode in the bitstream as much as possible. This improves coding efficiency, and reduces calculation complexity of video decoding.

Technical Solution in Embodiment 2 of this Application

When a frame of picture is to be coded, the picture is first split into picture blocks of a same size, where the picture blocks are referred to as largest coding units LCUs; and then a recursive split operation is performed on one LCU, so that one or more CUs may be obtained. The LCU has two sizes: 128×128 or 64×64, for selection. For example, in the following description, it is assumed that a size of the LCU is 128×128, and a principle of a size of the LCU being 64×64 is similar to a principle of the size of the LCU being 128×128. Details are not described again.

Figure 9:
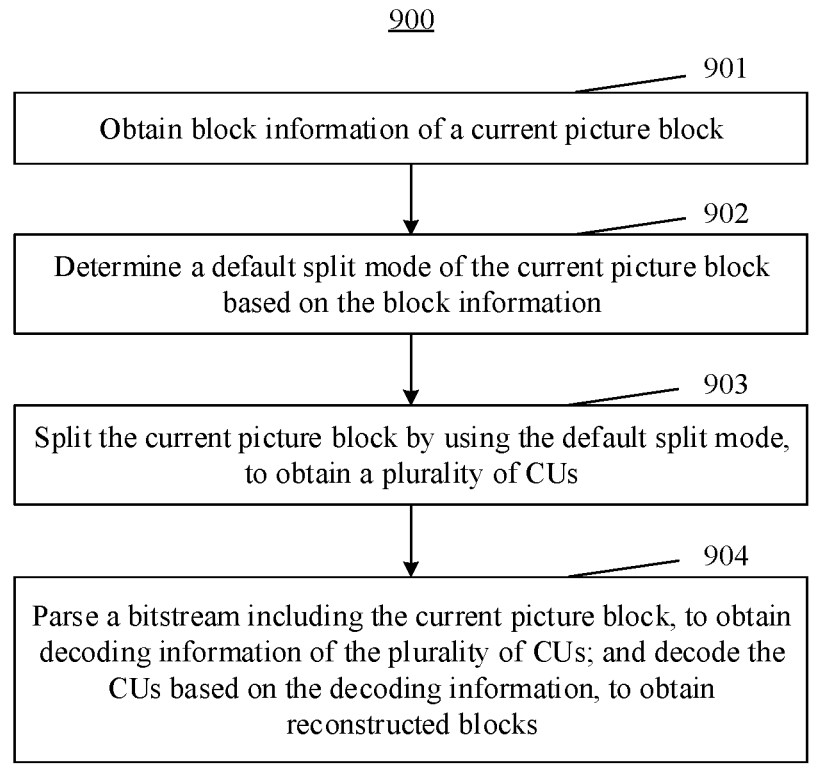
FIG. 9 is another schematic flowchart of a video decoding method according to an embodiment of this application.

FIG. 9 is a flowchart of a video decoding method according to an embodiment of this application. A process 900 may be performed by a video decoder 30. The process 900 is described as a series of steps or operations. It should be understood that steps or operations of the process 900 may be performed in various sequences and/or simultaneously, and are not limited to an execution sequence shown in FIG. 9. As shown in FIG. 9, the method includes the following steps.

At step 901: obtain block information of a current picture block.

The current picture block is a picture block obtained by splitting a current picture, and corresponds to a node on a coding tree of the current picture. The current picture block may be a CTU of the current picture, or may be a sub-block obtained by splitting the CTU by using the CTU as a root node, or may be a lower-level sub-block obtained by splitting a certain-level sub-block by using the certain-level sub-block as a root node. The block information of the current picture block may include size information of the current picture block, for example, a width of the current picture block, a height of the current picture block, or a region, obtained based on a width and a height, of the current picture block; and may further include coordinates of a pixel in the current picture block, where an top-left vertex of the current picture is used as an origin of the coordinates of the pixel, a rightward direction is a positive direction of an x-axis, and a downward direction is a positive direction of a y-axis. The block information may further include other picture-related information corresponding to the current picture block. The block information can be obtained by parsing a bitstream of the current picture.

At step 902: determine a default split mode of the current picture block based on the block information.

A decoding device may determine the default split mode of the current picture block according to the following method. The default split mode means that a split mode of the current picture block does not need to be obtained by parsing the bitstream, and the default split mode is directly used to split the current picture block.

In this embodiment of this application, the default split mode of the current picture block may be determined based on the block information of the current picture block. The following describes, as an example, a process in which the decoding device determines the default split mode in this application. It should be noted that the process includes but is not limited to a method of a condition set, and a plurality of conditions included in the condition set are not sequential.

Determining whether the default split mode is a QT split mode includes: The decoding device determines, based on the block information, whether the current picture block meets a condition in a seventh determining condition set. If the current picture block meets at least one condition in the seventh determining condition set, the default split mode is the QT split mode, and it is determined that a variable forceSplitQT=1; otherwise, forceSplitQT=0.

The seventh determining condition set includes one or more of the following conditions.

(1) The current picture block exceeds a bottom-right boundary of a picture in which the current picture block is located.

(2) The current picture block is an I slice or an I frame, and a width and a height of the current picture block each are equal to maxLCU, where maxLCU includes 64, 128, or 256, and a default value is 128.

Determining whether the default split mode is a VBT split mode includes: The decoding device determines, based on the block information, whether the current picture block meets a condition in an eighth determining condition set. If the current picture block meets at least one condition in the eighth determining condition set, the default split mode is the VBT split mode, and it is determined that a variable forceSplitBtVer=1; otherwise, forceSplitBtVer=0.

The eighth determining condition set includes one or more of the following conditions.

(1) If the current picture block exceeds a right boundary of a picture in which the current picture block is located, and a width and a height of the current picture block do not meet the following: the width is equal to K, the height is equal to L, K is less than L, and K and L each are an integer greater than or equal to 32, where 32, 64, 128, or 256 may be selected, and K is 64 and L is 128 by default, the VBT split mode is forcibly used for the current picture block.

(2) If the current picture block exceeds a bottom boundary of a picture in which the current picture block is located, and a width and a height of the current picture block meet the following: the width is equal to K, the height is equal to L, K is greater than L, K and L each are an integer greater than or equal to 32, for example, K is 128 and L is 64, the VBT split mode is forcibly used for the current picture block.

Determining whether the default split mode is an HBT split mode includes: The decoding device determines, based on the block information, whether the current picture block meets a condition in a ninth determining condition set. If the current picture block meets at least one condition in the ninth determining condition set, the default split mode is the HBT split mode, and it is determined that a variable forceSplitBtHor=1; otherwise, forceSplitBtHor=0.

The ninth determining condition set includes one or more of the following conditions.

(1) If the current picture block exceeds a bottom boundary of a picture in which the current picture block is located, and a width and a height of the current picture block do not meet the following: the width is equal to K, the height is equal to L, K is greater than L, and K and L each are an integer greater than or equal to 32, where 32, 64, 128, or 256 may be selected, and K is 128 and L is 64 by default, the HBT split mode is forcibly used for the current picture block.

(2) If the current picture block exceeds a right boundary of a picture in which the current picture block is located, and a width and a height of the current picture block meet the following: the width is equal to K, the height is equal to L, K is less than L, K and L each are an integer greater than or equal to 32, for example, K is 64 and L is 128, the HBT split mode is forcibly used for the current picture block.

At step 903: split the current picture block by using the default split mode, to obtain a plurality of CUs.

At step 904: parse a bitstream including the current picture block, to obtain decoding information of the plurality of CUs; and decode the CUs based on the decoding information, to obtain a reconstructed block.

According to this application, when a split mode of the current picture block is to be obtained, the current picture block is split in a default mode, so as to avoid transmitting information about the split mode in the bitstream as much as possible. This improves coding efficiency, and reduces calculation complexity of video decoding.

If there is no available default split mode for the current picture block, the decoding device may determine, based on the block information, whether a split mode in a set of optional split modes is available. The set of optional split modes includes the VBT split mode, the HBT split mode, a horizontal extended quadtree HEQT split mode, a vertical extended quadtree VEQT split mode, and the QT split mode. A split mode of the current picture block is determined from a determined available split mode; the current picture block is split by using the split mode of the current picture block, to obtain the plurality of CUs; and the bitstream is parsed to obtain the decoding information of the plurality of CUs, and the CUs are decoded based on the decoding information, to obtain the reconstructed blocks.

In this application, when the default split mode cannot be used for the current picture block, the decoding device may determine the split mode of the current picture block by using the method in Embodiment 1, or may determine the split mode of the current picture block by using another method. This is not specifically limited in this application.

For example, the decoding device may determine the split mode of the current picture block by using the following method.

(a) The QT split mode is allowed when both the width and the height of the current picture block are greater than or equal to MinQtSize; and it is determined that allowSplitQt=0. MinQtSize is transmitted in an SPS. 64, 32, 16, 8, 4, or the like may be selected, and a default value is 4.

(b) The HBT split mode or the VBT split mode is allowed when both the width and the height of the current picture block are less than or equal to MaxBtSize; and it is determined that allowSplitBtVer=1 or allowSplitBtHor=1. MaxBtSize is transmitted in the SPS. 128, 64, 32, 16, or the like may be selected, and a default value is 128.

(c) The HEQT split mode or the VEQT split mode is allowed when both the width and the height of the current picture block are less than or equal to MaxEqtSize; and it is determined that allowSplitEqtVer=0 or allowSplitaqtHor=0. MaxEqtSize is transmitted in the SPS. 64, 32, or the like may be selected, and a default value is 64.

(d) If the height of the current picture block is equal to minCUSize, the HBT split mode is not allowed, and it is determined that allowSplitBtVer=0. minCUSize is a minimum CU side length, for example, 4 or 8.

(e) If the width of the current picture block is equal to minCUSize, the VBT split mode is not allowed, and it is determined that allowSplitBtVer=0. minCUSize is a minimum CU side length, for example, 4 or 8.

(f) If the height of the current picture block is less than or equal to minCUSize×2, or the width of the current picture block is equal to minCUSize, the HEQT split mode is not allowed, and it is determined that allowSplitaqtHor=0, where minCUSize is a minimum CU side length, for example, 4 or 8.

(g) If the width of the current picture block is less than or equal to minCUSize×2, or the height of the current picture block is equal to minCUSize, the VEQT split mode is not allowed, and it is determined that allowSplitEqtVer=0, where minCUSize is a minimum CU side length, for example, 4 or 8.

(h) If a ratio of the height to the width of the current picture block is equal to MaxPartSizeRatio, the QT split mode, the VBT split mode, and the VEQT split mode are not allowed, and it is determined that allowSplitBtVer=0, allowSplitEqtVer=0, and allowSplitQt=0. MaxPartSizeRatio is transmitted in the SPS. 8, 4, 2, or the like may be selected, and a default value is 8.

(i) If a ratio of the width to the height of the current picture block is equal to MaxPartSizeRatio, the QT split mode, the HBT split mode, and the HEQT split mode cannot be selected, and it is determined that allowSplitBtHor=0, allowSplitaqtHor=0, and allowSplitQt=0. MaxPartSizeRatio is transmitted in the SPS. 8, 4, 2, or the like may be selected, and a default value is 8.

Figure 10:
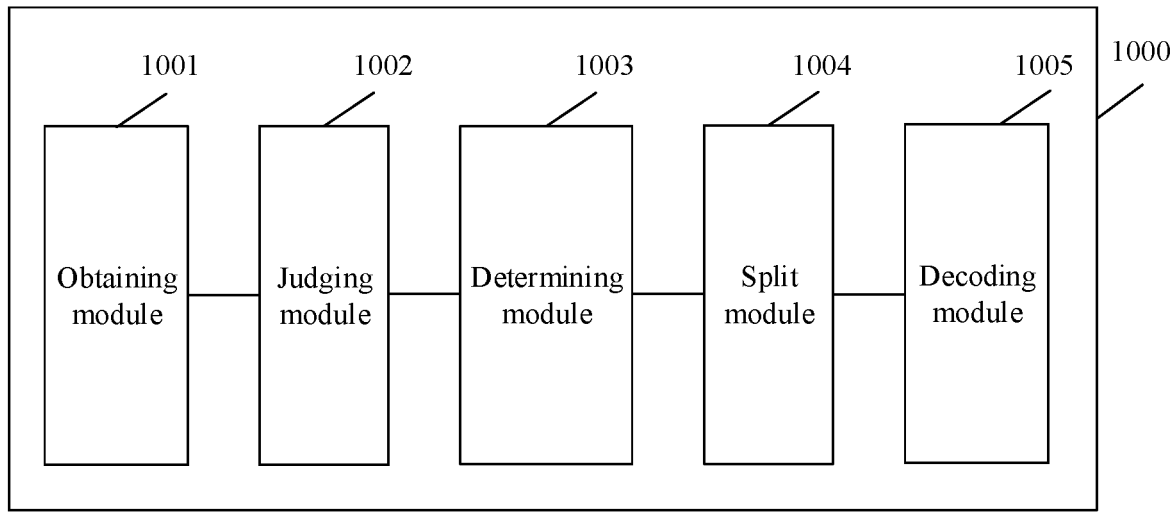
FIG. 10 is a structural block diagram of a video decoding apparatus according to an embodiment of this application.

FIG. 10 is a schematic block diagram of a video decoding apparatus 1000 according to an embodiment of this application. The video decoding apparatus 1000 may include: an obtaining module 1001, configured to obtain block information of a current picture block; a judging module 1002, configured to determine, based on the block information, whether a split mode in a set of optional split modes is available, where the set of optional split modes includes a non-split mode; a determining module 1003, configured to determine a split mode of the current picture block from a determined available split mode; a split module 1004, configured to obtain one CU or a plurality of CUs from the current picture block based on the split mode of the current picture block, where the one CU is obtained by applying the non-split mode to the current picture block; and a decoding module 1005, configured to parse a bitstream including the current picture block, to obtain decoding information of the one CU or the plurality of CUs, and decode the CU based on the decoding information, to obtain a reconstructed block.

In a feasible implementation, the set of optional split modes further includes a horizontal binary tree HBT split mode, a vertical binary tree VBT split mode, a horizontal extended quadtree HEQT split mode, a vertical extended quadtree VEQT split mode, and a quadtree QT split mode.

In a feasible implementation, the judging module 1002 is specifically configured to determine, based on the block information, whether the current picture block meets a condition in a first determining condition set, where if the current picture block meets at least one condition in the first determining condition set, the non-split mode is unavailable; or if the current picture block meets none of conditions in the first determining condition set, the non-split mode is available.

The first determining condition set includes one or more of the following conditions:

(1) the current picture block is an I slice or an I frame, and a side length of the current picture block is equal to MaxLCU, where MaxLCU is a side length of a largest coding unit LCU;

(2) a ratio of a long side to a short side of the current picture block is greater than maxAspectRatio, where maxAspectRatio is an integer greater than or equal to 1;

(3) the current picture block exceeds a boundary of a picture in which the current picture block is located;

(4) a width of the current picture block is greater than pipelineSize, and a height of the current picture block is less than pipelineSize, where pipelineSize is an integer greater than or equal to 16; and (5) a height of the current picture block is greater than pipelineSize, and a width of the current picture block is less than pipelineSize.

In a feasible implementation, the judging module 1002 is specifically configured to determine, based on the block information, whether the current picture block meets a condition in a second determining condition set, where if the current picture block meets at least one condition in the second determining condition set, the HBT split mode is unavailable; or if the current picture block meets none of conditions in the second determining condition set, the HBT split mode is available.

The second determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) the current picture block exceeds a bottom boundary of a picture in which the current picture block is located, a width of the current picture block is greater than K, and a height of the current picture block is equal to K, where K includes 128, 64, 32, 16, 8, or 4;

(4) a width of the current picture block is greater than pipelineSize, and a height of the current picture block is less than or equal to pipelineSize, where pipelineSize is an integer greater than or equal to 1;

(5) the current picture block exceeds a right boundary or a bottom-right boundary of a picture in which the current picture block is located;

(6) at least one side length of the current picture block is greater than maxBTSize, where maxBTSize is an integer greater than or equal to 8;

(7) a height of the current picture block is equal to a minimum CU side length;

(8) the current picture block does not exceed a boundary of a picture in which the current picture block is located, and a ratio of a width to a height of the current picture block is greater than or equal to maxRatio, where maxRatio is an integer greater than or equal to 1;

(9) a ratio of a width to a height of the current picture block is greater than or equal to maxRatio, where maxRatio is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a feasible implementation, the judging module 1002 is specifically configured to determine, based on the block information, whether the current picture block meets a condition in a third determining condition set, where if the current picture block meets at least one condition in the third determining condition set, the VBT split mode is unavailable; or if the current picture block meets none of conditions in the third determining condition set, the VBT split mode is available.

The third determining condition set includes one or more of the following conditions:

(1) the current picture block is an I slice or an I frame, and a side length of the current picture block is equal to MaxLCU, where MaxLCU is a side length of an LCU;

(2) a size of the current picture block is M×128, where M is a natural number less than 128;

(3) the current picture block exceeds a bottom boundary or a bottom-right boundary of a picture in which the current picture block is located;

(4) the current picture block exceeds a right boundary of a picture in which the current picture block is located, a width of the current picture block is equal to K, and a height of the current picture block is greater than K, where K includes 128, 64, 32, 16, 8, or 4;

(5) a ratio of a width to a height of the current picture block is equal to minRatio, where minRatio is greater than 0 and less than or equal to 1;

(6) at least one side length of the current picture block is greater than maxBTSize, where maxBTSize is an integer greater than or equal to 16;

(7) a width of the current picture block is equal to a minimum CU side length;

(8) the current picture block does not exceed a boundary of a picture in which the current picture block is located, and a ratio of a height to a width of the current picture block is greater than or equal to maxRatio, where maxRatio is an integer greater than or equal to 1;

(9) a height of the current picture block is greater than pipelineSize, and a width of the current picture block is less than or equal to pipelineSize, where pipelineSize is an integer greater than or equal to 1; and

(10) a quantity of layers obtained by performing binary tree split and/or extended quadtree split on the current picture block is greater than or equal to maxBTTDepth, where maxBTTDepth is an integer greater than or equal to 1.

In a feasible implementation, the judging module 1002 is specifically configured to determine, based on the block information, whether the current picture block meets a condition in a fourth determining condition set, where if the current picture block meets at least one condition in the fourth determining condition set, the HEQT split mode is unavailable; or if the current picture block meets none of conditions in the fourth determining condition set, the HEQT split mode is available.

The fourth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to maxRatio, where maxRatio is an integer greater than or equal to 1;

(6) at least one side length of the current picture block is greater than maxEQTSize, where maxEQTSize is an integer greater than or equal to 16;

(7) a height of the current picture block is less than or equal to minCUSize×2, or a width of the current picture block is equal to minCUSize, where minCUSize is a minimum CU side length;

(8) a ratio of a width to a height of the current picture block is greater than or equal to maxRatioEQT, where maxRatioEQT is an integer greater than or equal to 1;

(9) the current picture block exceeds a boundary of a picture in which the current picture block is located; and

(10) a quantity of layers obtained by performing binary tree split and/or extended quadtree split on the current picture block is greater than or equal to maxBTTDepth, where maxBTTDepth is an integer greater than or equal to 1.

In a feasible implementation, the judging module 1002 is specifically configured to determine, based on the block information, whether the current picture block meets a condition in a fifth determining condition set, where if the current picture block meets at least one condition in the fifth determining condition set, the VEQT split mode is unavailable; or if the current picture block meets none of conditions in the fifth determining condition set, the VEQT split mode is available.

The fifth determining condition set includes one or more of the following conditions:

(1) the current picture block is an I slice or an I frame, and a side length of the current picture block is equal to MaxLCU, where MaxLCU is a side length of an LCU;

(2) a size of the current picture block is 128×N, where N is a natural number less than 128;

(3) a size of the current picture block is M×128, where M is a natural number less than 128;

(4) the current picture block exceeds a boundary of a picture in which the current picture block is located, and a size of the current picture block is 128×N or M×128, where M and N each are a natural number less than 128;

(5) a ratio of a width to a height of the current picture block is equal to minRatio, where minRatio is greater than 0 and less than or equal to 1;

(6) at least one side length of the current picture block is greater than maxEQTSize, where maxEQTSize is an integer greater than or equal to 16;

(7) a width of the current picture block is less than or equal to minCUSize×2, or a height of the current picture block is equal to minCUSize, where minCUSize is a minimum CU side length;

(8) the current picture block exceeds a boundary of a picture in which the current picture block is located; and (9) a quantity of layers obtained by performing binary tree split and/or extended quadtree split on the current picture block is greater than or equal to maxBTTDepth, where maxBTTDepth is an integer greater than or equal to 1.

In a feasible implementation, the judging module 1002 is specifically configured to determine, based on the block information, whether the current picture block meets a condition in a sixth determining condition set, where if the current picture block meets at least one condition in the sixth determining condition set, the QT split mode is unavailable; or if the current picture block meets none of conditions in the sixth determining condition set, the QT split mode is available.

The sixth determining condition set includes one or more of the following conditions:

(1) a size of the current picture block is 128×N, where N is a natural number less than 128;

(2) a size of the current picture block is M×128, where M is a natural number less than 128;

(3) a ratio of a width to a height of the current picture block is equal to maxRatio, where maxRatio is an integer greater than or equal to 1;

(4) a ratio of a width to a height of the current picture block is equal to minRatio, where minRatio is greater than 0 and less than or equal to;

(5) at least one side length of the current picture block is less than minQtSize, where minQtSize is an integer greater than or equal to 4;

(6) a quantity of layers obtained by performing binary tree split and/or extended quadtree split on the current picture block is greater than 0; and (7) the current picture block exceeds a bottom boundary or a right boundary of a picture in which the current picture block is located.

In a feasible implementation, the determining module 1003 is specifically configured to determine the split mode of the current picture block based on a determining result about whether the split mode in the set of optional split modes is available; or parse the bitstream to determine the split mode of the current picture block.

In a feasible implementation, the determining module 1003 is specifically configured to: if the QT split mode is available, and all split modes in the set of optional split modes except the QT split mode are unavailable, determine that the split mode of the current picture block is the QT split mode; or if the QT split mode is available, and at least one split mode in the set of optional split modes other than the QT split mode is available, parse the bitstream to determine the split mode of the current picture block.

In a feasible implementation, if the QT split mode is unavailable, the determining module 1003 is further configured to: if the non-split mode is available, and all split modes in the set of optional split modes except the non-split mode and the QT split mode are unavailable, determine that the split mode of the current picture block is the non-split mode; or if the non-split mode is available, and at least one split mode in the set of optional split modes other than the non-split mode and the QT split mode is available, parse the bitstream to determine the split mode of the current picture block.

In a feasible implementation, the split module 1004 is specifically configured to: when the split mode of the current picture block is the non-split mode, determine that the current picture block is the one CU; or when the split mode of the current picture block is any split mode in the set of optional split modes except the non-split mode, split the current picture block based on the split mode of the current picture block, where if at least one side length of a sub-block obtained through split is T, and T is 4 or 8, the sub-block is the one CU; otherwise, the sub-block is further split.

Figure 11:
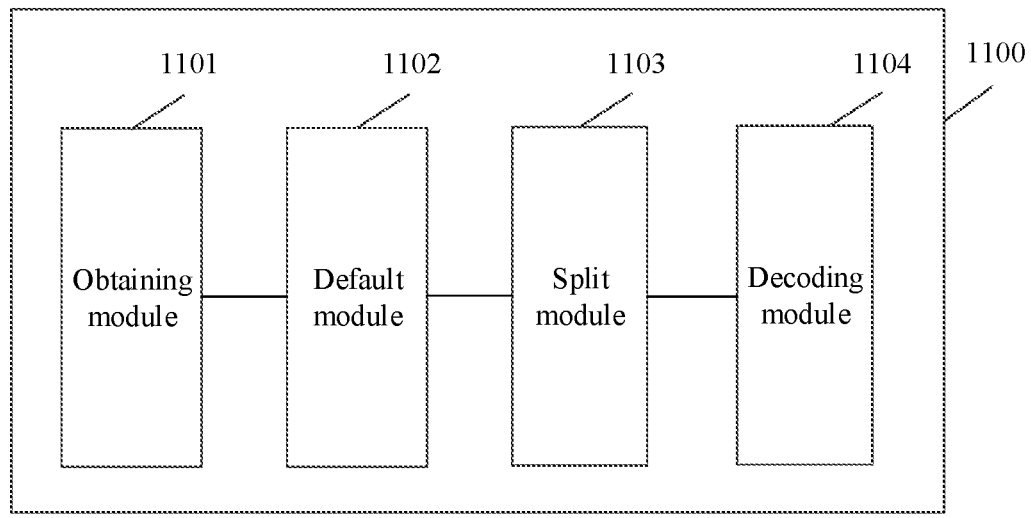
FIG. 11 is another structural block diagram of a video decoding apparatus according to an embodiment of this application.

FIG. 11 is a schematic block diagram of a video decoding apparatus 1100 according to an embodiment of this application. The video decoding apparatus 1100 may include: an obtaining module 1101, configured to obtain block information of a current picture block; a default module 1102, configured to determine a default split mode of the current picture block based on the block information; a split module 1103, configured to split the current picture block by using the default split mode, to obtain a plurality of coding units CUs; and a decoding module 1104, configured to parse a bitstream including the current picture block, to obtain decoding information of the plurality of CUs, and decode the CUs based on the decoding information, to obtain reconstructed blocks.

In a feasible implementation, the default module 1102 is specifically configured to determine, based on the block information, whether the current picture block meets a condition in a seventh determining condition set, where if the current picture block meets at least one condition in the seventh determining condition set, the default split mode is a quadtree QT split mode.

The seventh determining condition set includes one or more of the following conditions:

(1) the current picture block exceeds a bottom-right boundary of a picture in which the current picture block is located; and (2) the current picture block is an I slice or an I frame, and a width and a height of the current picture block each are equal to maxLCU, where maxLCU includes 64, 128, or 256.

In a feasible implementation, the default module 1102 is specifically configured to determine, based on the block information, whether the current picture block meets a condition in an eighth determining condition set, where if the current picture block meets at least one condition in the eighth determining condition set, the default split mode is a vertical binary tree VBT split mode.

The eighth determining condition set includes one or more of the following conditions:

(1) if the current picture block exceeds a right boundary of a picture in which the current picture block is located, and a width and a height of the current picture block do not meet the following: the width is equal to K, the height is equal to L, K is less than L, and K and L each are an integer greater than or equal to 32, the VBT split mode is forcibly used for the current picture block; and (2) if the current picture block exceeds a bottom boundary of a picture in which the current picture block is located, and a width and a height of the current picture block meet the following: the width is equal to K, the height is equal to L, K is greater than L, K and L each are an integer greater than or equal to 32, the VBT split mode is forcibly used for the current picture block.

In a feasible implementation, the default module 1102 is specifically configured to determine, based on the block information, whether the current picture block meets a condition in a ninth determining condition set, where if the current picture block meets at least one condition in the ninth determining condition set, the default split mode is a horizontal binary tree HBT split mode.

The ninth determining condition set includes one or more of the following conditions:

(1) if the current picture block exceeds a bottom boundary of a picture in which the current picture block is located, and a width and a height of the current picture block do not meet the following: the width is equal to K, the height is equal to L, K is greater than L, and K and L each are an integer greater than or equal to 32, the HBT split mode is forcibly used for the current picture block; and (2) if the current picture block exceeds a right boundary of a picture in which the current picture block is located, and a width and a height of the current picture block meet the following: the width is equal to K, the height is equal to L, K is less than L, K and L each are an integer greater than or equal to 32, the HBT split mode is forcibly used for the current picture block.

Figure 12:
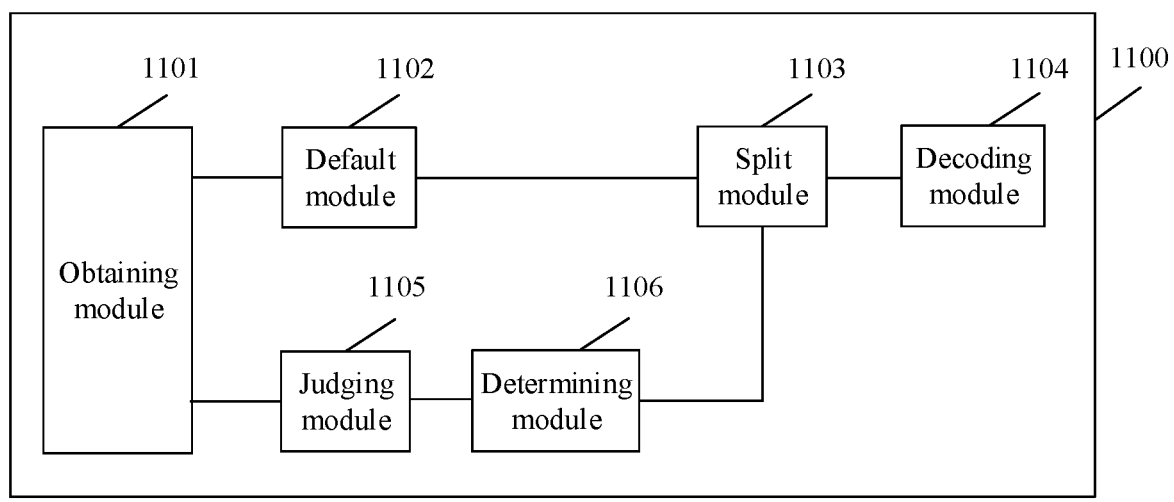
FIG. 12 is still another structural block diagram of a video decoding apparatus according to an embodiment of this application.

Based on the embodiment shown in FIG. 11, FIG. 12 is a schematic block diagram of a video decoding apparatus 1100 according to an embodiment of this application. The video decoding apparatus 1100 may further include: a judging module 1105, configured to determine, based on the block information, whether a split mode in a set of optional split modes is available, where the set of optional split modes includes the VBT split mode, the HBT split mode, a horizontal extended quadtree HEQT split mode, a vertical extended quadtree VEQT split mode, and the QT split mode; and a determining module 1106, configured to determine a split mode of the current picture block from a determined available split mode; where the split module 1103 is further configured to split the current picture block by using the split mode of the current picture block, to obtain the plurality of CUs; and the decoding module 1104 is further configured to parse the bitstream to obtain the decoding information of the plurality of CUs, and decode the CUs based on the decoding information, to obtain the reconstructed blocks.

It should be noted that modules in the inter prediction apparatus in the embodiments of this application are functional bodies for implementing various execution steps included in the inter prediction method in this application, that is, functional bodies that can implement all steps in the inter prediction method in this application and extensions and variants of these steps. For details, refer to descriptions of the inter prediction method in this specification. For brevity, details are not described in this specification.

It would be appreciated that the functions described with reference to various illustrative logical blocks, modules, and algorithm steps disclosed and described in this specification can be implemented by using hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage medium may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSP), general-purpose microprocessors, application-specific integrated circuits (ASIC), field programmable gate arrays (FPGA), or other equivalent integrated circuits or discrete logic circuits. Therefore, the term "processor" used in this specification may refer to the foregoing structure, or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, descriptions of the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video decoding method, comprising:
obtaining block information of a current picture block;
determining, based on the block information, whether a split mode of a set of optional split modes is available, wherein the set of optional split modes comprises a non-split mode;
determining a split mode of the current picture block from a determined available split mode;
obtaining at least one coding unit (CU) from the current picture block based on the split mode of the current picture block, wherein the at least one CU is obtained by applying the non-split mode to the current picture block;
parsing a bitstream comprising the current picture block, to obtain decoding information of the at least one CU;
decoding the at least one CU based on the decoding information, to obtain a reconstructed block; and
wherein the determining, based on the block information, whether the non-split mode is available comprises:
determining, based on the block information, whether the current picture block meets a condition of a first determining condition set, wherein the first determining condition set further comprises the following condition:
the current picture block is an I slice or an I frame, and a side length of the current picture block is equal to MaxLCU, wherein MaxLCU is a side length of a largest coding unit (LCU).

2. The method according to claim 1, wherein the set of optional split modes further comprises a horizontal binary tree (HBT) split mode, a vertical binary tree (VBT) split mode, a horizontal extended quadtree (HEQT) split mode, a vertical extended quadtree (VEQT) split mode, and a quadtree (QT) split mode.

3. The method according to claim 1,
wherein
based on the current picture block meeting at least one condition of the first determining condition set, the non-split mode is unavailable; or
based on the current picture block meeting none of conditions of the first determining condition set, the non-split mode is available; and
the first determining condition set further comprises at least one of the following conditions:
(2) a ratio of a long side to a short side of the current picture block is greater than maxAspectRatio, wherein maxAspectRatio is an integer greater than or equal to 1;
(4) a width of the current picture block is greater than pipelineSize, and a height of the current picture block is less than pipelineSize, wherein pipelineSize is an integer greater than or equal to 16; or
(5) a height of the current picture block is greater than pipelineSize, and a width of the current picture block is less than pipelineSize.

4. The method according to claim 2, wherein determining, based on the block information, whether the HBT split mode is available comprises:
determining, based on the block information, whether the current picture block meets a condition of a second determining condition set, wherein
based on the current picture block meeting at least one condition of the second determining condition set, the HBT split mode is unavailable; or
based on the current picture block meeting none of conditions of the second determining condition set, the HBT split mode is available; and
the second determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) the current picture block exceeds a bottom boundary of a picture in which the current picture block is located, a width of the current picture block is greater than K, and a height of the current picture block is equal to K, wherein K comprises 128, 64, 32, 16, 8, or 4;
(4) a width of the current picture block is greater than pipelineSize, and a height of the current picture block is less than or equal to pipelineSize, wherein pipelineSize is an integer greater than or equal to 1;
(5) the current picture block exceeds a right boundary or a bottom-right boundary of a picture in which the current picture block is located;
(6) at least one side length of the current picture block is greater than maxBTSize, wherein maxBTSize is an integer greater than or equal to 8;
(7) a height of the current picture block is equal to a minimum CU side length;
(8) the current picture block does not exceed a boundary of a picture in which the current picture block is located, and a ratio of a width to a height of the current picture block is greater than or equal to maxRatio, wherein maxRatio is an integer greater than or equal to 1;
(9) a ratio of a width to a height of the current picture block is greater than or equal to maxRatio, wherein maxRatio is an integer greater than or equal to 1; and
(10) a quantity of layers obtained by performing binary tree split and/or extended quadtree split on the current picture block is greater than or equal to maxBTTDepth, wherein maxBTTDepth is an integer greater than or equal to 1.

5. The method according to claim 2, wherein determining, based on the block information, whether the VBT split mode is available comprises:
determining, based on the block information, whether the current picture block meets a condition of a third determining condition set, wherein
based on the current picture block meeting at least one condition of the third determining condition set, the VBT split mode is unavailable; or
based on the current picture block meeting none of conditions of the third determining condition set, the VBT split mode is available; and the third determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is M×128, wherein M is a natural number less than 128;
(3) the current picture block exceeds a bottom boundary or a bottom-right boundary of a picture in which the current picture block is located;
(4) the current picture block exceeds a right boundary of a picture in which the current picture block is located, a width of the current picture block is equal to K, and a height of the current picture block is greater than K, wherein K comprises 128, 64, 32, 16, 8, or 4;
(5) a ratio of a width to a height of the current picture block is equal to minRatio, wherein minRatio is greater than 0 and less than or equal to 1;
(6) at least one side length of the current picture block is greater than maxBTSize, wherein maxBTSize is an integer greater than or equal to 16;
(7) a width of the current picture block is equal to a minimum CU side length;
(8) the current picture block does not exceed a boundary of a picture in which the current picture block is located, and a ratio of a height to a width of the current picture block is greater than or equal to maxRatio, wherein maxRatio is an integer greater than or equal to 1;
(9) a height of the current picture block is greater than pipelineSize, and a width of the current picture block is less than or equal to pipelineSize, wherein pipelineSize is an integer greater than or equal to 1; and
(10) a quantity of layers obtained by performing binary tree split and/or extended quadtree split on the current picture block is greater than or equal to maxBTTDepth, wherein maxBTTDepth is an integer greater than or equal to 1.

6. The method according to claim 2, wherein determining, based on the block information, whether the HEQT split mode is available comprises:
determining, based on the block information, whether the current picture block meets a condition of a fourth determining condition set, wherein
based on the current picture block meeting at least one condition of the fourth determining condition set, the HEQT split mode is unavailable; or
based on the current picture block meeting none of conditions of the fourth determining condition set, the HEQT split mode is available; and
the fourth determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) a size of the current picture block is M×128, wherein M is a natural number less than 128;
(4) the current picture block exceeds a boundary of a picture in which the current picture block is located, and a size of the current picture block is 128×N or M×128, wherein M and N each is a natural number less than 128;
(5) a ratio of a width to a height of the current picture block is equal to maxRatio, wherein maxRatio is an integer greater than or equal to 1;
(6) at least one side length of the current picture block is greater than maxEQTSize, wherein maxEQTSize is an integer greater than or equal to 16;
(7) a height of the current picture block is less than or equal to minCUSize×2, or a width of the current picture block is equal to minCUSize, wherein minCUSize is a minimum CU side length;
(8) a ratio of a width to a height of the current picture block is greater than or equal to maxRatioEQT, wherein maxRatioEQT is an integer greater than or equal to 1;
(9) the current picture block exceeds a boundary of a picture in which the current picture block is located; and
(10) a quantity of layers obtained by performing binary tree split and/or extended quadtree split on the current picture block is greater than or equal to maxBTTDepth, wherein maxBTTDepth is an integer greater than or equal to 1.

7. The method according to claim 2, wherein determining, based on the block information, whether the VEQT split mode is available comprises:
determining, based on the block information, whether the current picture block meets a condition of a fifth determining condition set, wherein
based on the current picture block meeting at least one condition of the fifth determining condition set, the VEQT split mode is unavailable; or
based on the current picture block meeting none of conditions of the fifth determining condition set, the VEQT split mode is available; and
the fifth determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) a size of the current picture block is M×128, wherein M is a natural number less than 128;
(4) the current picture block exceeds a boundary of a picture in which the current picture block is located, and a size of the current picture block is 128×N or M×128, wherein M and N each is a natural number less than 128;
(5) a ratio of a width to a height of the current picture block is equal to minRatio, wherein minRatio is greater than 0 and less than or equal to 1;
(6) at least one side length of the current picture block is greater than maxEQTSize, wherein maxEQTSize is an integer greater than or equal to 16;
(7) a width of the current picture block is less than or equal to minCUSize×2, or a height of the current picture block is equal to minCUSize, wherein minCUSize is a minimum CU side length;
(8) the current picture block exceeds a boundary of a picture in which the current picture block is located; and
(9) a quantity of layers obtained by performing binary tree split and/or extended quadtree split on the current picture block is greater than or equal to maxBTTDepth, wherein maxBTTDepth is an integer greater than or equal to 1.

8. The method according to claim 2, wherein determining, based on the block information, whether the QT split mode is available comprises:
determining, based on the block information, whether the current picture block meets a condition of a sixth determining condition set, wherein
based on the current picture block meeting at least one condition of the sixth determining condition set, the QT split mode is unavailable; or
based on the current picture block meeting none of conditions of the sixth determining condition set, the QT split mode is available; and
the sixth determining condition set comprises at least one of the following conditions:
(1) a size of the current picture block is 128×N, wherein N is a natural number less than 128;
(2) a size of the current picture block is M×128, wherein M is a natural number less than 128;
(3) a ratio of a width to a height of the current picture block is equal to maxRatio, wherein maxRatio is an integer greater than or equal to 1;
(4) a ratio of a width to a height of the current picture block is equal to minRatio, wherein minRatio is greater than 0 and less than or equal to 1;
(5) at least one side length of the current picture block is less than minQtSize, wherein minQtSize is an integer greater than or equal to 4;
(6) a quantity of layers obtained by performing binary tree split and/or extended quadtree split on the current picture block is greater than 0; and
(7) the current picture block exceeds a bottom boundary or a right boundary of a picture in which the current picture block is located.

9. The method according to claim 1, wherein the determining a split mode of the current picture block from a determined available split mode comprises:
determining the split mode of the current picture block based on determining whether the split mode of the set of optional split modes is available; or
parsing the bitstream to determine the split mode of the current picture block.

10. The method according to claim 9, wherein the determining the split mode of the current picture block based on determining whether the split mode of the set of optional split modes is available comprises:
based on a quadtree (QT) split mode being available, and all split modes of the set of optional split modes except the QT split mode being unavailable, determining that the split mode of the current picture block is the QT split mode; or
based on a QT split mode being available, and at least one split mode of the set of optional split modes other than the QT split mode being available, parsing the bitstream to determine the split mode of the current picture block.

11. The method according to claim 10, wherein based on the QT split mode being unavailable, the determining the split mode of the current picture block based on determining whether the split mode of the set of optional split modes being available further comprises:
based on the non-split mode being available, and all split modes of the set of optional split modes except the non-split mode and the QT split mode being unavailable, determining that the split mode of the current picture block is the non-split mode; or
based on the non-split mode being available, and at least one split mode of the set of optional split modes other than the non-split mode and the QT split mode being available, parsing the bitstream to determine the split mode of the current picture block.

12. The method according to claim 1, wherein the obtaining the at least one CU from the current picture block based on the split mode of the current picture block comprises:
based on the split mode of the current picture block being the non-split mode, determining that the current picture block is the at least one CU; or
based on the split mode of the current picture block being any split mode of the set of optional split modes except the non-split mode, splitting the current picture block based on the split mode of the current picture block, wherein based on at least one side length of a sub-block obtained through split being T, and T being 4 or 8, the sub-block is the at least one CU; otherwise, the sub-block further splits.

13. A video decoding method, comprising:
obtaining block information of a current picture block;
determining a default split mode of the current picture block based on the block information;
splitting the current picture block by using the default split mode, to obtain a plurality of coding units (CUs);
parsing a bitstream comprising the current picture block, to obtain decoding information of the plurality of CUs;
decoding the plurality of CUs based on the decoding information, to obtain reconstructed blocks; and
wherein the determining the default split mode of the current picture block based on the block information comprises:
determining, based on the block information, whether the current picture block meets a condition of a first determining condition set, wherein the first determining condition set further comprises the following condition:
the current picture block is an I slice or an I frame, and a side length of the current picture block is equal to MaxLCU, wherein MaxLCU is a side length of a largest coding unit (LCU).

14. The method according to claim 13, wherein the determining the default split mode of the current picture block based on the block information comprises:
determining, based on the block information, whether the current picture block meets a condition of a seventh determining condition set, wherein
based on the current picture block meeting at least one condition of the seventh determining condition set, the default split mode is a quadtree (QT) split mode; and
the seventh determining condition set comprises at least one of the following conditions:
(1) the current picture block exceeds a bottom-right boundary of a picture in which the current picture block is located; and
(2) the current picture block is an I slice or an I frame, and a width and a height of the current picture block each is equal to maxLCU, wherein maxLCU comprises 64, 128, or 256.

15. The method according to claim 13, wherein the determining a default split mode of the current picture block based on the block information comprises:
determining, based on the block information, whether the current picture block meets a condition of an eighth determining condition set, wherein
based on the current picture block meeting at least one condition of the eighth determining condition set, the default split mode is a vertical binary tree (VBT) split mode; and the eighth determining condition set comprises at least one of the following conditions:
(1) based on the current picture block exceeding a right boundary of a picture in which the current picture block is located, and a width and a height of the current picture block not meeting the following: the width is equal to K, the height is equal to L, K is less than L, and K and L each is an integer greater than or equal to 32, the VBT split mode is used for the current picture block; and
(2) based on the current picture block exceeding a bottom boundary of a picture in which the current picture block is located, and a width and a height of the current picture block meeting the following: the width is equal to K, the height is equal to L, K is greater than L, K and L is are an integer greater than or equal to 32, the VBT split mode is used for the current picture block.

16. The method according to claim 13, wherein the determining a default split mode of the current picture block based on the block information comprises:
determining, based on the block information, whether the current picture block meets a condition of a ninth determining condition set, wherein
based on the current picture block meeting at least one condition of the ninth determining condition set, the default split mode is a horizontal binary tree (HBT) split mode; and
the ninth determining condition set comprises at least one of the following conditions:
(1) based on the current picture block exceeding a bottom boundary of a picture in which the current picture block is located, and a width and a height of the current picture block not meeting the following: the width is equal to K, the height is equal to L, K is greater than L, and K and L each is an integer greater than or equal to 32, the HBT split mode is used for the current picture block; and
(2) based on the current picture block exceeding a right boundary of a picture in which the current picture block is located, and a width and a height of the current picture block meeting the following: the width is equal to K, the height is equal to L, K is less than L, K and L each is an integer greater than or equal to 32, the HBT split mode is used for the current picture block.

17. The method according to claim 13, wherein after the obtaining block information of a current picture block, the method further comprises:
determining, based on the block information, whether a split mode of a set of optional split modes is available, wherein the set of optional split modes comprises a VBT split mode, an HBT split mode, a horizontal extended quadtree (HEQT) split mode, a vertical extended quadtree (VEQT) split mode, and a QT split mode;
determining a split mode of the current picture block from a determined available split mode;
splitting the current picture block by using the split mode of the current picture block, to obtain the plurality of CUs;
parsing the bitstream to obtain the decoding information of the plurality of CUs; and
decoding the plurality of CUs based on the decoding information, to obtain the reconstructed blocks.

18. A video decoding apparatus, comprising a processor and a non-transitory memory coupled to the processor and having processor-executable instructions stored thereon, which when executed by the processor, cause the apparatus to:
obtain block information of a current picture block;
determine, based on the block information, whether a split mode of a set of optional split modes is available, wherein the set of optional split modes comprises a non-split mode;
determine a split mode of the current picture block from a determined available split mode;
obtain at least one coding unit (CU) from the current picture block based on the split mode of the current picture block, wherein the at least one CU is obtained by applying the non-split mode to the current picture block;
parse a bitstream comprising the current picture block, to obtain decoding information of the at least one CU;
decode the at least one CU based on the decoding information, to obtain a reconstructed block; and
wherein the determining, based on the block information, whether the non-split mode is available comprises:
determining, based on the block information, whether the current picture block meets a condition of a first determining condition set, wherein the first determining condition set further comprises the following condition:
the current picture block is an I slice or an I frame, and a side length of the current picture block is equal to MaxLCU, wherein MaxLCU is a side length of a largest coding unit (LCU).

19. The apparatus according to claim 18, wherein the set of optional split modes further comprises a horizontal binary tree (HBT) split mode, a vertical binary tree (VBT) split mode, a horizontal extended quadtree (HEQT) split mode, a vertical extended quadtree (VEQT) split mode, and a quadtree (QT) split mode.

20. The apparatus according to claim 18, wherein based on the current picture block meeting at least one condition of the first determining condition set, the non-split mode is unavailable; or based on the current picture block meeting none of conditions of the first determining condition set, the non-split mode is available; and
the first determining condition set further comprises at least one of the following conditions:
(2) a ratio of a long side to a short side of the current picture block is greater than maxAspectRatio, wherein maxAspectRatio is an integer greater than or equal to 1;
(4) a width of the current picture block is greater than pipelineSize, and a height of the current picture block is less than pipelineSize, wherein pipelineSize is an integer greater than or equal to 16; and
(5) a height of the current picture block is greater than pipelineSize, and a width of the current picture block is less than pipelineSize.

21. The apparatus according to claim 19, wherein the instructions, which when executed by the processor, further cause the apparatus to determine, based on the block information, whether the current picture block meets a condition of a second determining condition set, wherein based on the current picture block meeting at least one condition of the second determining condition set, the HBT split mode is unavailable; or based on the current picture block meeting none of conditions of the second determining condition set, the HBT split mode is available; and
the second determining condition set comprises at least one of the following conditions:

(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) the current picture block exceeds a bottom boundary of a picture in which the current picture block is located, a width of the current picture block is greater than K, and a height of the current picture block is equal to K, wherein K comprises 128, 64, 32, 16, 8, or 4;
(4) a width of the current picture block is greater than pipelineSize, and a height of the current picture block is less than or equal to pipelineSize, wherein pipelineSize is an integer greater than or equal to 1;
(5) the current picture block exceeds a right boundary or a bottom-right boundary of a picture in which the current picture block is located;
(6) at least one side length of the current picture block is greater than maxBTSize, wherein maxBTSize is an integer greater than or equal to 8;
(7) a height of the current picture block is equal to a minimum CU side length;
(8) the current picture block does not exceed a boundary of a picture in which the current picture block is located, and a ratio of a width to a height of the current picture block is greater than or equal to maxRatio, wherein maxRatio is an integer greater than or equal to 1;
(9) a ratio of a width to a height of the current picture block is greater than or equal to maxRatio, wherein maxRatio is an integer greater than or equal to 1; and
(10) a quantity of layers obtained by performing binary tree split and/or extended quadtree split on the current picture block is greater than or equal to maxBTTDepth, wherein maxBTTDepth is an integer greater than or equal to 1.

22. The apparatus according to claim 19, wherein the instructions, which when executed by the processor, further cause the apparatus to determine, based on the block information, whether the current picture block meets a condition of a third determining condition set, wherein based on the current picture block meeting at least one condition of the third determining condition set, the VBT split mode is unavailable; or based on the current picture block meeting none of conditions of the third determining condition set, the VBT split mode is available; and
the third determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is M×128, wherein M is a natural number less than 128;
(3) the current picture block exceeds a bottom boundary or a bottom-right boundary of a picture in which the current picture block is located;
(4) the current picture block exceeds a right boundary of a picture in which the current picture block is located, a width of the current picture block is equal to K, and a height of the current picture block is greater than K, wherein K comprises 128, 64, 32, 16, 8, or 4;
(5) a ratio of a width to a height of the current picture block is equal to minRatio, wherein minRatio is greater than 0 and less than or equal to 1;
(6) at least one side length of the current picture block is greater than maxBTSize, wherein maxBTSize is an integer greater than or equal to 16;
(7) a width of the current picture block is equal to a minimum CU side length;
(8) the current picture block does not exceed a boundary of a picture in which the current picture block is located, and a ratio of a height to a width of the current picture block is greater than or equal to maxRatio, wherein maxRatio is an integer greater than or equal to 1;
(9) a height of the current picture block is greater than pipelineSize, and a width of the current picture block is less than or equal to pipelineSize, wherein pipelineSize is an integer greater than or equal to 1; and
(10) a quantity of layers obtained by performing binary tree split and/or extended quadtree split on the current picture block is greater than or equal to maxBTTDepth, wherein maxBTTDepth is an integer greater than or equal to 1.

23. The apparatus according to claim 19, wherein the instructions, which when executed by the processor, further cause the apparatus to determine, based on the block information, whether the current picture block meets a condition of a fourth determining condition set, wherein based on the current picture block meeting at least one condition of the fourth determining condition set, the HEQT split mode is unavailable; or based on the current picture block meeting none of conditions of the fourth determining condition set, the HEQT split mode is available; and
the fourth determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) a size of the current picture block is M×128, wherein M is a natural number less than 128;
(4) the current picture block exceeds a boundary of a picture in which the current picture block is located, and a size of the current picture block is 128×N or M×128, wherein M and N each is a natural number less than 128;
(5) a ratio of a width to a height of the current picture block is equal to maxRatio, wherein maxRatio is an integer greater than or equal to 1;
(6) at least one side length of the current picture block is greater than maxEQTSize, wherein maxEQTSize is an integer greater than or equal to 16;
(7) a height of the current picture block is less than or equal to minCUSize×2, or a width of the current picture block is equal to minCUSize, wherein minCUSize is a minimum CU side length;
(8) a ratio of a width to a height of the current picture block is greater than or equal to maxRatioEQT, wherein maxRatioEQT is an integer greater than or equal to 1;
(9) the current picture block exceeds a boundary of a picture in which the current picture block is located; and
(10) a quantity of layers obtained by performing binary tree split and/or extended quadtree split on the current picture block is greater than or equal to maxBTTDepth, wherein maxBTTDepth is an integer greater than or equal to 1.

24. The apparatus according to claim 19, wherein the instructions, which when executed by the processor, further cause the apparatus to determine, based on the block information, whether the current picture block meets a condition of a fifth determining condition set, wherein based on the current picture block meeting at least one condition of the fifth determining condition set, the VEQT split mode is unavailable; or based on the current picture block meeting none of conditions of the fifth determining condition set, the VEQT split mode is available; and the fifth determining condition set comprises at least one of the following conditions:
(1) the current picture block is an I slice or an I frame, and a side length of the current picture block is equal to MaxLCU, wherein MaxLCU is a side length of an LCU;
(2) a size of the current picture block is 128×N, wherein N is a natural number less than 128;
(3) a size of the current picture block is M×128, wherein M is a natural number less than 128;
(4) the current picture block exceeds a boundary of a picture in which the current picture block is located, and a size of the current picture block is 128×N or M×128, wherein M and N each is a natural number less than 128;
(5) a ratio of a width to a height of the current picture block is equal to minRatio, wherein minRatio is greater than 0 and less than or equal to 1;
(6) at least one side length of the current picture block is greater than maxEQTSize, wherein maxEQTSize is an integer greater than or equal to 16;
(7) a width of the current picture block is less than or equal to minCUSize×2, or a height of the current picture block is equal to minCUSize, wherein minCUSize is a minimum CU side length;
(8) the current picture block exceeds a boundary of a picture in which the current picture block is located; and
(9) a quantity of layers obtained by performing binary tree split and/or extended quadtree split on the current picture block is greater than or equal to maxBTTDepth, wherein maxBTTDepth is an integer greater than or equal to 1.

25. The apparatus according to claim 19, wherein the instructions, which when executed by the processor, further cause the apparatus to determine, based on the block information, whether the current picture block meets a condition of a sixth determining condition set, wherein based on the current picture block meeting at least one condition of the sixth determining condition set, the QT split mode is unavailable; or based on the current picture block meeting none of conditions of the sixth determining condition set, the QT split mode is available; and the sixth determining condition set comprises at least one of the following conditions:
(1) a size of the current picture block is 128×N, wherein N is a natural number less than 128;
(2) a size of the current picture block is M×128, wherein M is a natural number less than 128;
(3) a ratio of a width to a height of the current picture block is equal to maxRatio, wherein maxRatio is an integer greater than or equal to 1;
(4) a ratio of a width to a height of the current picture block is equal to minRatio, wherein minRatio is greater than 0 and less than or equal to 1;
(5) at least one side length of the current picture block is less than minQtSize, wherein minQtSize is an integer greater than or equal to 4;
(6) a quantity of layers obtained by performing binary tree split and/or extended quadtree split on the current picture block is greater than 0; and
(7) the current picture block exceeds a bottom boundary or a right boundary of a picture in which the current picture block is located.

26. The apparatus according to claim 18, wherein the instructions, which when executed by the processor, further cause the apparatus to determine the split mode of the current picture block based on determining whether the split mode of the set of optional split modes is available; or parse the bitstream to determine the split mode of the current picture block.

27. The apparatus according to claim 26, wherein the instructions, which when executed by the processor, further cause the apparatus to: based on a quadtree (QT) split mode being available, and all split modes of the set of optional split modes except the QT split mode being unavailable, determine that the split mode of the current picture block is the QT split mode; or based on a QT split mode being available, and at least one split mode of the set of optional split modes other than the QT split mode being available, parse the bitstream to determine the split mode of the current picture block.

28. The apparatus according to claim 27, wherein based on the QT split mode being unavailable, the instructions, which when executed by the processor, further cause the apparatus to: based on the non-split mode being available, and all split modes of the set of optional split modes except the non-split mode and the QT split mode being unavailable, determine that the split mode of the current picture block is the non-split mode; or based on the non-split mode being available, and at least one split mode of the set of optional split modes other than the non-split mode and the QT split mode being available, parse the bitstream to determine the split mode of the current picture block.

29. The apparatus according to claim 18, wherein the instructions, which when executed by the processor, further cause the apparatus to: based on the split mode of the current picture block being the non-split mode, determine that the current picture block is the at least one CU; or based on the split mode of the current picture block being any split mode of the set of optional split modes except the non-split mode, split the current picture block based on the split mode of the current picture block, wherein based on at least one side length of a sub-block obtained through split being T, and T being 4 or 8, the sub-block is the at least one CU; otherwise, the sub-block further splits.

30. A video decoding apparatus, comprising a processor and a non-transitory memory coupled to the processor and having processor-executable instructions stored thereon, which when executed by the processor, cause the apparatus to:
obtain block information of a current picture block;
determine a default split mode of the current picture block based on the block information;
split the current picture block by using the default split mode, to obtain a plurality of coding units (CUs);
parse a bitstream comprising the current picture block, to obtain decoding information of the plurality of CUs;
decode the plurality of CUs based on the decoding information, to obtain reconstructed blocks; and wherein the determining the default split mode of the current picture block based on the block information comprises:

determining, based on the block information, whether the current picture block meets a condition of a first determining condition set, wherein the first determining condition set further comprises the following condition:

the current picture block is an I slice or an I frame, and a side length of the current picture block is equal to MaxLCU, wherein MaxLCU is a side length of a largest coding unit (LCU).

31. The apparatus according to claim 30, wherein the instructions, which when executed by the processor, further cause the apparatus to determine, based on the block information, whether the current picture block meets a condition of a seventh determining condition set, wherein based on the current picture block meeting at least one condition of the seventh determining condition set, the default split mode is a quadtree (QT) split mode; and the seventh determining condition set comprises at least one of the following conditions:
(1) the current picture block exceeds a bottom-right boundary of a picture in which the current picture block is located; and
(2) the current picture block is an I slice or an I frame, and a width and a height of the current picture block each is equal to maxLCU, wherein maxLCU comprises 64, 128, or 256.

32. The apparatus according to claim 30, wherein the instructions, which when executed by the processor, further cause the apparatus to determine, based on the block information, whether the current picture block meets a condition of an eighth determining condition set, wherein based on the current picture block meeting at least one condition of the eighth determining condition set, the default split mode is a vertical binary tree (VBT) split mode; and the eighth determining condition set comprises at least one of the following conditions:
(1) based on the current picture block exceeding a right boundary of a picture in which the current picture block is located, and a width and a height of the current picture block not meeting the following: the width is equal to K, the height is equal to L, K is less than L, and K and L each is an integer greater than or equal to 32, the VBT split mode is used for the current picture block; and
(2) based on the current picture block exceeding a bottom boundary of a picture in which the current picture block is located, and a width and a height of the current picture block meeting the following: the width is equal to K, the height is equal to L, K is greater than L, K and L each is an integer greater than or equal to 32, the VBT split mode is used for the current picture block.

33. The apparatus according to claim 30, wherein the instructions, which when executed by the processor, further cause the apparatus to determine, based on the block information, whether the current picture block meets a condition of a ninth determining condition set, wherein based on the current picture block meeting at least one condition of the ninth determining condition set, the default split mode is a horizontal binary tree (HBT) split mode; and the ninth determining condition set comprises at least one of the following conditions:
(1) based on the current picture block exceeding a bottom boundary of a picture in which the current picture block is located, and a width and a height of the current picture block not meeting the following: the width is equal to K, the height is equal to L, K is greater than L, and K and L each is an integer greater than or equal to 32, the HBT split mode is used for the current picture block; and
(2) based on the current picture block exceeding a right boundary of a picture in which the current picture block is located, and a width and a height of the current picture block meeting the following: the width is equal to K, the height is equal to L, K is less than L, K and L each is an integer greater than or equal to 32, the HBT split mode is used for the current picture block.

34. The apparatus according to claim 30, wherein the instructions, which when executed by the processor, further cause the apparatus to:

determine, based on the block information, whether a split mode of a set of optional split modes is available, wherein the set of optional split modes comprises a VBT split mode, an HBT split mode, a horizontal extended quadtree (HEQT) split mode, a vertical extended quadtree (VEQT) split mode, and a QT split mode;

determine a split mode of the current picture block from a determined available split mode;

split the current picture block by using the split mode of the current picture block, to obtain the plurality of CUs;

parse the bitstream to obtain the decoding information of the plurality of CUs; and decode the plurality of CUs based on the decoding information, to obtain the reconstructed blocks.

* * * * *